United States Patent
Amano et al.

(10) Patent No.: US 11,129,387 B2
(45) Date of Patent: Sep. 28, 2021

(54) HERBICIDE COMPOSITION

(71) Applicant: KUMIAI CHEMICAL INDUSTRY CO., LTD., Tokyo (JP)

(72) Inventors: Yuta Amano, Tokyo (JP); Atsushi Nagamatsu, Tokyo (JP)

(73) Assignee: KUMIAI CHEMICAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/314,763

(22) PCT Filed: Jul. 7, 2017

(86) PCT No.: PCT/JP2017/025057
§ 371 (c)(1),
(2) Date: Jan. 2, 2019

(87) PCT Pub. No.: WO2018/008766
PCT Pub. Date: Jan. 11, 2018

(65) Prior Publication Data
US 2019/0254278 A1    Aug. 22, 2019

(30) Foreign Application Priority Data
Jul. 8, 2016 (JP) .............................. JP2016-135637

(51) Int. Cl.
| | | |
|---|---|---|
| *A01N 43/60* | (2006.01) | |
| *A01N 33/18* | (2006.01) | |
| *A01N 35/10* | (2006.01) | |
| *A01N 37/10* | (2006.01) | |
| *A01N 37/34* | (2006.01) | |
| *A01N 43/40* | (2006.01) | |
| *A01N 43/653* | (2006.01) | |
| *A01N 43/80* | (2006.01) | |
| *A01N 43/82* | (2006.01) | |
| *A01N 43/90* | (2006.01) | |
| *A01N 47/20* | (2006.01) | |
| *A01N 47/30* | (2006.01) | |
| *A01N 47/36* | (2006.01) | |
| *A01N 57/20* | (2006.01) | |
| *A01N 37/40* | (2006.01) | |
| *A01N 43/56* | (2006.01) | |
| *A01N 47/12* | (2006.01) | |

(52) U.S. Cl.
CPC ............. *A01N 43/60* (2013.01); *A01N 33/18* (2013.01); *A01N 35/10* (2013.01); *A01N 37/10* (2013.01); *A01N 37/34* (2013.01); *A01N 37/40* (2013.01); *A01N 43/40* (2013.01); *A01N 43/56* (2013.01); *A01N 43/653* (2013.01); *A01N 43/80* (2013.01); *A01N 43/82* (2013.01); *A01N 43/90* (2013.01); *A01N 47/12* (2013.01); *A01N 47/20* (2013.01); *A01N 47/30* (2013.01); *A01N 47/36* (2013.01); *A01N 57/20* (2013.01)

(58) Field of Classification Search
CPC ........ A01N 43/60; A01N 37/40; A01N 43/56; A01N 47/12; A01N 33/18; A01N 35/10; A01N 37/10; A01N 37/34; A01N 43/40; A01N 43/653; A01N 43/80; A01N 43/82; A01N 43/90; A01N 47/20; A01N 47/30; A01N 47/36; A01N 57/20
See application file for complete search history.

(56) References Cited

U.S. PATENT DOCUMENTS

| | | |
|---|---|---|
| 5,416,061 A | 5/1995 | Hewett et al. |
| 6,214,770 B1 * | 4/2001 | Millet .................... A01N 41/10 504/138 |
| 2002/0004457 A1 | 1/2002 | Nevill et al. |

(Continued)

FOREIGN PATENT DOCUMENTS

| | | |
|---|---|---|
| CA | 2000928 | 4/1990 |
| EA | 010976 | 12/2008 |

(Continued)

OTHER PUBLICATIONS

International Search Report dated Oct. 3, 2017 in International Application No. PCT/JP2017/025057.

(Continued)

*Primary Examiner* — Mina Haghighatian
*Assistant Examiner* — Nathan W Schlientz
(74) *Attorney, Agent, or Firm* — Wenderoth, Lind & Ponack, L.L.P.

(57) ABSTRACT

The invention provides an herbicide composition, which contains as active ingredients a Component A selected from the group consisting of an oxopyrazine derivative represented by the following Formula X and salts thereof, and a Components B described in the Specification, and which is capable of controlling effectively the growth of an plant undesirable for a useful plant, is highly safe to a useful plant, and exerts high effect at a low dosage:

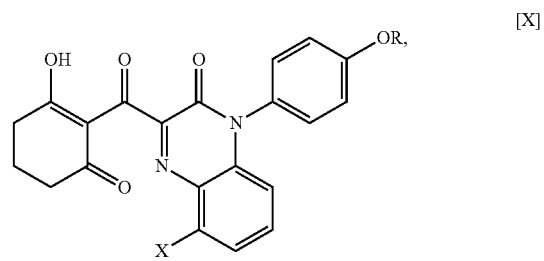

where R represents a lower alkyl group having 1 to 6 carbon atoms, and X represents a halogen atom, respectively.

8 Claims, No Drawings

(56) References Cited

U.S. PATENT DOCUMENTS

| | | |
|---|---|---|
| 2010/0197674 A1 | 8/2010 | Tamai et al. |
| 2012/0295791 A1 | 11/2012 | Nagasawa et al. |
| 2013/0137577 A1 | 5/2013 | Tamai et al. |

FOREIGN PATENT DOCUMENTS

| | | | | |
|---|---|---|---|---|
| EP | 0 365 484 | | 4/1990 | |
| JP | 62-190178 | | 8/1987 | |
| JP | 2014-148487 | | 8/2014 | |
| JP | 2014148487 A | * | 8/2014 | |
| RU | 2 093 987 | | 10/1997 | |
| RU | 2 240 001 | | 11/2004 | |
| WO | 00/27203 | | 5/2000 | |
| WO | 2004/006643 | | 1/2004 | |
| WO | 2009/016841 | | 2/2009 | |
| WO | 2011/071187 | | 6/2011 | |
| WO | 2013/054495 | | 4/2013 | |
| WO | WO-2013054495 A1 | * | 4/2013 | ............. A01N 43/60 |

OTHER PUBLICATIONS

The Pesticide Manual 17th. Edition, BCPC, (2015).
Ag Chem New Compound Review, vol. 28, (2010).
Kangetsu Hirase et al., "Influence of water management, application timing and temperature on efficacy of MTB-951, a mycoherbicide using *Drechslera monoceras* to control *Echinochloa crus-galli* L." Weed Biology and Management, vol. 4, No. 2, pp. 71-74 (2004).
Recent Agrochemicals and Technical Papers, (2011), with English translation of front page and colophon.

\* cited by examiner

HERBICIDE COMPOSITION

TECHNICAL FIELD

The present invention relates to a novel herbicide composition comprising a combination of herbicidal active ingredients suitable for selective control of weeds in cultivation of a useful plant, and a method for producing the same.

The present invention also relates to a method for controlling the growth of weeds in cultivation of a useful plant, and a use of the novel herbicide composition therefor.

BACKGROUND ART

Various herbicides have been developed so far and contributed to higher agricultural productivity and labor saving. However, since some herbicides have been used for many years, there appear an increasing number of hardly controllable weeds on which these herbicides do not work well. Therefore, emergence of an herbicide that has a wide weed control spectrum and is also effective on the hardly controllable weeds, has been desired. In addition, in order to get rid of the environmental pollution problem of the conventional herbicide, development of an herbicide that is highly active and is effective even at a low dosage has been also desired. Furthermore, in order to cope with nonuniform emergence of weeds over a long period of time, development of an herbicide that is superior in the residual activity and has a wide allowable time range for application exhibiting efficacy over a wide range from the pre-emergence stage to the growth stage of weeds has been also desired. Meanwhile, it has been known that, when a conventional herbicide is used, an herbicide injury may occur in crops due to various factors including climate conditions such as temperature, wind, and light, soil conditions such as soil texture and the content of organic matters in soil, cultivation management conditions such as shallow transplantation depth, and deep flooding management, and chemical application conditions, such as nonuniform application, or overdose application of an herbicide. Therefore, an herbicide having high safety free from a fear of herbicide injury of crops even under such conditions is also desired.

Specifically, for example, Patent Documents 1 to 6, Non Patent Documents 1 to 4, etc. describe a large number of compounds exhibiting an herbicidal action. Further, the microbial pesticide MTB-951 (Tasmart) described in Non Patent Document 3 is *Drechslera monoceras*, a phytopathogenic imperfect fungus, which is known to have an herbicidal action especially on a barnyard grass. However, with the herbicides alone there may be a case where a desired wide range of spectrum, the growth control effect on weeds over a long period of time, or an adequate effect on protection of a useful plant cannot be obtained.

RELATED ART DOCUMENTS

Patent Documents

[Patent Document 1] JPS62-190178A
[Patent Document 2] EP 365484
[Patent Document 3] WO 2011/071187
[Patent Document 4] WO 2009/016841
[Patent Document 5] WO 2013/054495
[Patent Document 6] JP2014-148487A

Non Patent Documents

[Non Patent Document 1] The Pesticide Manual 17th. Edition, (2015 BCPC)
[Non Patent Document 2] Ag Chem New Compound Review, 2010
[Non Patent Document 3] Weed Biology and Management, p. 71-74, Vol 4 (No. 2), (2004)
[Non Patent Document 4] Recent Agrochemicals and Technical Papers, 2011, (CMC Publishing Co., Ltd., 2011)

SUMMARY OF THE INVENTION

Problems to be Solved by the Invention

The present invention has been made in view of the above-described drawbacks of the prior art with a main object to provide an herbicide composition which is capable of controlling effectively the growth of an plant undesirable for a useful plant, is highly safe to a useful plant, and exerts high effect at a low dosage.

Means for Solving the Problems

As a result of diligent studies to achieve the object, the present inventors have found that by using a mixture or a combination of a component selected from the group consisting of a specific oxopyrazine derivative and a salt thereof, and a component selected from a publicly known herbicide, a plant growth regulator, and a safener, not only an additive effect of the respective herbicidal activities, but also a synergistic weed killing activity may be obtained, or herbicide injury may be mitigated synergistically. More particularly, it has been found that an herbicide composition of the present invention is capable of controlling a variety of undesirable plants (weeds) that grow in dry field, paddy field, garden, lawn, etc. over a long period of time, and has high safety to a useful plant. Further, it becomes clear that an herbicide composition of the present invention is capable of controlling most of weeds, especially those that grow in cultivating a useful plant, in both the stage before emergence and the stage of growth after the emergence, and is substantially not harmful to a useful plant, and thereby completing the present invention.

Specifically, it has been found that by mixing or combining two or more kinds of chemicals comprising a Component A selected from the group consisting of a oxopyrazine derivative represented by Formula X below and salts thereof, and a Component B described below, the herbicidal spectrum is enlarged as compared with the herbicide applicable range of each of the Component A or the Component B, the herbicidal effect is attained earlier, further the effect persists longer, and an adequate effect is obtained at a lower dosage as compared with the solo dosage of each component, and that the safety to a useful plant, including corn, rice, grain *Sorghum*, soybean, cotton, sugar beet, sugarcane, lawn, fruit tree, small grain cereals such as wheat, barley, rye, and oat, etc. is secured, and further that an adequate herbicidal effect is obtained by a single application.

An oxopyrazine derivative is described in Patent Document 4. Also Patent Document 5 and Patent Document 6 describe that by mixing or combining an oxopyrazine derivative and a publicly known herbicide, the herbicidal spectrum is enlarged as compared with the herbicide applicable range of each component and at the same time the herbicidal effect is attained earlier, the effect persists longer, and an adequate effect is obtained at a lower dosage as compared with the solo dosage of each component.

However, Patent Documents 5 and 6 describe only that the herbicidal spectrum is enlarged with respect to weeds that may be problematic in cultivation of a so-called summer crop such as rice, corn, soybean, and cotton, and an adequate effect is obtained at a lower dosage as compared with the dosage of each component, but have not disclosed specifically that the above effects may be obtained with respect to weeds that may be problematic in cultivation of small grain cereals.

That is, the present invention is characterized by the following gist.

(1) An herbicide composition comprising, as active ingredients, a Component A selected from the group consisting of an oxopyrazine derivative represented by the following Formula X and salts thereof and a Component B described below:

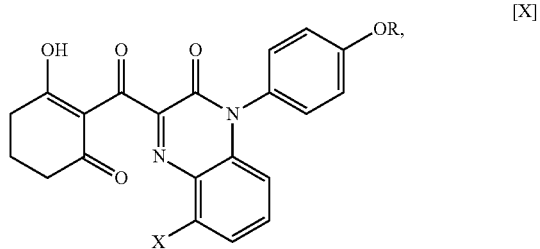

where R and X represent a lower alkyl group having 1 to 6 carbon atoms and a halogen atom respectively; and the Component B including:

as herbicides, a compound selected from ioxynil, aclonifen, acrolein, azafenidin, acifluorfen (including salts such as sodium), azimsulfuron, asulam, acetochlor, atrazine, anilofos, amicarbazone, amidosulfuron, amitrole, aminocyclopyrachlor, aminopyralid, amiprofos-methyl, ametryn, alachlor, alloxydim, ancymidol, isouron, isoxachlortole, isoxaflutole, isoxaben, isodecylalkoholethoxylat, isoproturon, ipfencarbazone, imazaquin, imazapic (including salts such as amine), imazapyr (including salts such as isopropylamine), imazamethabenz-methyl, imazamox, imazethapyr, imazosulfuron, indaziflam, indanofan, eglinazine-ethyl, esprocarb, ethametsulfuron-methyl, ethalfluralin, ethidimuron, ethoxysulfuron, ethoxyfen-ethyl, ethofumesate, etobenzanid, endothal-disodium, oxadiazon, oxadiargyl, oxaziclomefone, oxasulfuron, oxyfluorfen, oryzalin, orthosulfamuron, orbencarb, oleic acid, cafenstrole, carfentrazone-ethyl, karbutilate, carbetamide, quizalofop, quizalofop-ethyl, quizalofop-P-ethyl, quizalofop-P-tefuryl, quinoclamine, quinclorac, quinmerac, cumyluron, clacyfos, glyphosate (including salts such as sodium, potassium, amine, propylamine, isopropylamine, dimethylamine or trimesium), glufosinate (including salts such as amine or sodium), glufosinate-P, glufosinate-P-sodium, clethodim, clodinafop-propargyl, clopyralid, clomazone, chlomethoxyfen, clomeprop, cloransulam-methyl, chloramben, chloridazon chlorimuron-ethyl, chlorsulfuron, chlorthal-dimethyl, chlorthiamid, chlorphthalim, chlorflurenol-methyl, chlorpropham, chlorbromuron, chloroxuron, chlorotoluron, ketospiradox (including salts such as sodium, calcium or ammonia), saflufenacil, sarmentine, cyanazine, cyanamide, diuron, diethatyl-ethyl, dicamba (including amine, diethylamine, isopropylamine, diglycolamine, sodium or lithium), cycloate, cycloxydim, diclosulam, cyclosulfamuron, cyclopyrimorate, dichlobenil, diclofop-P-methyl, diclofop-methyl, dichlorprop, dichlorprop-P, diquat, dithiopyr, siduron, dinitramine, cinidon-ethyl, cinosulfuron, dinoseb, dinoterb, cyhalofop-butyl, diphenamid, difenzoquat, diflufenican, diflufenzopyr, simazine, dimethachlor, dimethametryn, dimethenamid, dimethenamid-P, simetryn, dimepiperate, dimefuron, cinmethylin, swep, sulcotrione, sulfentrazone, sulfosate, sulfosulfuron, sulfometuron-methyl, sethoxydim, terbacil, daimuron, thaxtomin A, dalapon, thiazopyr, tiafenacil, thiencarbazone (including sodium salt, methyl ester or the like), tiocarbazil, thiobencarb, thidiazimin, thidiazuron, thifensulfuron-methyl, desmedipham, desmetryne, thenylchlor, tebutam, tebuthiuron, tepraloxydim, tefuryltrione, terbuthylazine, terbutryn, terbumeton, tembotrione, topramezone, tralkoxydim, triaziflam, triasulfuron, triafamone, tri-allate, trietazine, triclopyr, triclopyr-butotyl, tritosulfuron, trifludimoxazin, triflusulfuron-methyl, trifluralin, trifloxysulfuron-sodium, tribenuron-methyl, tolpyralate, naptalam (including salts such as sodium), naproanilide, napropamide, napropamide-M, nicosulfuron, neburon, norflurazon, vernolate, paraquat dichloride, halauxifen-benzyl, halauxifen-methyl, haloxyfop, haloxyfop-P, haloxyfop-etotyl, halosafen, halosulfuron-methyl, picloram, picolinafen, bicyclopyrone, bispyribac-sodium, pinoxaden, bifenox, piperophos, pyraclonil, pyrasulfotole, pyrazoxyfen, pyrazosulfuron-ethyl, pyrazolynate, bilanafos, pyraflufen-ethyl, pyridafol, pyrithiobac-sodium, pyridate, pyriftalid, pyributicarb, pyribenzoxim, pyrimisulfan, pyriminobac-methyl, pyroxasulfone, pyroxsulam, phenisopham, fenuron, fenoxasulfone, fenoxaprop (including methyl, ethyl and isopropyl ester), fenoxaprop-P (including methyl, ethyl and isopropyl ester), fenthiaprop-ethyl, fentrazamide, phenmedipham, foramsulfuron, butachlor, butafenacil, butamifos, butylate, butenachlor, butralin, butroxydim, flazasulfuron, flamprop (including methyl, ethyl and isopropyl ester), flamprop-M (including methyl, ethyl and isopropyl ester), primisulfuron-methyl, fluazifop-butyl, fluazifop-P-butyl, fluazolate, fluometuron, fluoroglycofen-ethyl, flucarbazone-sodium, fluchloralin, flucetosulfuron, fluthiacet-methyl, flupyrsulfuron-methyl (including salts such as sodium, calcium or ammonia), flufenacet, flufenpyr-ethyl, flupropanate, flupoxame, flumioxazin, flumiclorac-pentyl, flumetsulam, fluridone, flurtamone, fluroxypyr (including esters such as butomethyl and meptyl, and salts such as sodium, calcium or ammonia), flurochloridone, pretilachlor, procarbazone-sodium, prodiamine, prosulfuron, prosulfocarb, propaquizafop, propachlor, propazine, propanil, propyzamide, propisochlor, propyrisulfuron, propham, profluazol, prohexadione-calcium, propoxycarbazone, propoxycarbazone-sodium, profoxydim, bromacil, brompyrazon, prometryn, prometon, bromoxynil (including esters such as butyric acid, octanoic acid or heptanoic acid), bromofenoxim, bromobutide, florasulam, florpyrauxifen, florpyrauxifen-benzyl, hexazinone, pethoxamid, benazolin, penoxsulam, heptamaloxyloglucan, beflubutamid, pebulate, pelargonic acid, bencarbazone, pendimethalin, benzfendizone, bensulide, bensulfuron-methyl, benzobicyclon, benzofenap, bentazone, pentanochlor, pentoxazone, benfluralin, benfuresate, fosamine, fomesafen, foramsulfuron, forchlorfenuron, mecoprop (including salts such as sodium, potassium, isopropylamine, triethanolamine or dimethylamine), mecoprop-P-potassium, mesosulfuron including esters such as methyl, mesotrione, metazachlor, metazosulfuron, methabenzthiazuron, metamitron, metamifop, metam, DSMA, methiozolin, methyldymuron, metoxuron, metosulam, metsulfuron-methyl, metobromuron, metobenzuron, metolachlor, metribuzin, mepiquat chloride, mefenacet, monosulfuron (including methyl, ethyl or isopropyl ester), monolinuron, molinate, iodosulfuron, iodosulfulon-methyl-sodium, iofensulfuron, iofensulfuron-sodium, lactofen, lancotrione, linuron, rimsulfuron, lenacil, TCA (including salts such as sodium, calcium or ammonia), 2,3,6-TBA, 2,4,5-T, 2,4-D (including salts such as amine, diethylamine, triethanolamine, isopropylamine, sodium or lithium), ACN, AE-F-150944 (Code number), MCPA, MCPB (including sodium salt, ethyl ester or the like), 2,4-DB, DNOC (including salts such as amine or sodium), MCPA-thioethyl, IR-6396 (Code number), SYP-298 (Code number), SYP-300 (Code number), EPTC, S-metolachlor, S-9750 (Code number), MSMA, and HW-02 (Code number), as well as salts and analogues of these compounds;

as plant growth regulators, a compound selected from 1-naphthylacetamide, 1-methylcyclopropene, 2,6-diisopropylnaphthalene, 4-CPA, 4-oxo-4-(2-phenylethyl) aminobutyric acid (Chemical Name, CAS Registry Number; 1083-55-2), n-decanol, aviglycine, abscisic acid, ancymidol, inabenfide, indole acetic acid, indole butyric acid, uniconazole, uniconazole-P, Ecolyst, ethychlozate, ethephon, oxinesulfate, epocholeone, carvone, calcium formate, cloxyfonac, cloxyfonac-potassium, cloprop, chlormequat, choline, cytokinins, cyclanilide, dikegulac, gibberellin acid, dimethipin, sintofen, daminozide, thidiazuron, triacontanol, trinexapac-ethyl, paclobutrazol, paraffin, flumetralin, flurprimidol, flurenol, prohydrojasmon, prohexadione-calcium, heptamaloxyloglucan, benzylaminopurine, forchlorfenuron, maleic hydrazide, mepiquat chloride, mefluidide, and calcium peroxide, as well as salts and analogs of these compounds; and as safeners, a compound selected from isoxadifen, isoxadifen-ethyl, oxabetrinil, cloquintcet-mexyl, diethotate, cyometrinil, dichlormid, dicyclonone, cyprosulfamide, 1,8-naphthalic anhydride, fenchlorazole-O-ethyl, fenclorim, furilazole, fluxofenim, flurazole, benoxacor, mephenate, mefenpyr, mefenpyr-ethyl, mefenpyr-diethyl, lower alkyl substituted benzoic acid, 2,2-dichloro-N-(1,3-dioxan-2-ylmethyl)-N-(2-propenyl)acetamide (PPG-1292), 2-dichloromethyl-2-methyl-1,3-dioxane (MG-191), 3-dichloroacetyl-2,2,5-trimethyl-1,3-oxazolidine (R-29148), 4-dichloroacetyl-1-oxa-4-azaspiro[4.5]decane (AD-67), MON4660 (Code number), N-(2-methoxybenzoyl)-4-[(methylaminocarbonyl)amino]benzenesulfonamide (chemical name, CAS Registry Number: 129531-12-0), N1,N2-diallyl-N2-dichloroacetyl glycinamide (DKA-24), TI-35 (Code number), and compounds represented by Formulas [III] and [IV] below, as well as salts and analogues of these compounds:

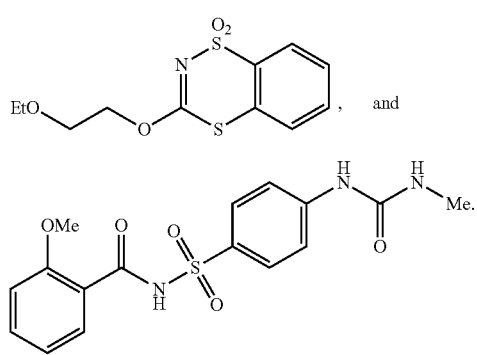

The herbicidal composition according to the above-described section (1), wherein the oxopyrazine derivative represented by the Formula X is a compound represented by the following Formula I:

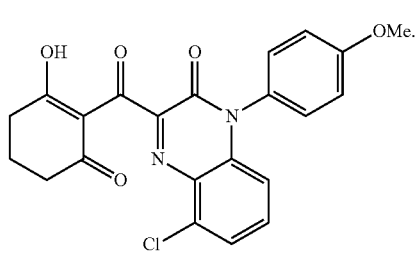

(3) The herbicide composition according to the above-described sentence (1) or (2), wherein the Component B is a compound selected from glyphosate ammonium salt, benfluralin, bromoxynil, carfentrazone-ethyl, chlorpropham, chlorotoluron, clethodim, cloquintocet-mexyl, clopyralid, dicamba, diflufenican, florasulam, flufenacet, flumioxazin, fluroxypyr, fluroxypyr-meptyl, flupyrsulfuron-methyl, imazosulfuron, isodecyl alcohol ethoxylate, isoproturon, isoxaben, isoxaflutole, iodosulfuron, glyphosate potassium salt, maleic hydrazide, MCPA, mecoprop-P-potassium salt, mesosulfuron-methyl, metsulfuron-methyl, nicosulfuron, pelargonic acid, pendimethalin, bentazone, pinoxaden, propyzamide, prosulfocarb, picolinafen, pyrasulfotole, pyraflufen-ethyl, pyroxasulfone, pyroxsulam, quinoclamine, quizalofop-P-tefuryl, quizalofop-ethyl, fentrazamide, rimsulfuron, sulfosulfuron, thifensulfuron-methyl, tri-allate, tribenuron-methyl, ioxynil, bicyclopyrone, and halauxifen-methyl, as well as salts and analogues of these compounds.

(4) The herbicidal composition according to any one of the above-described sentences (1) to (3), wherein the mass ratio of the Component A to the Component B is 1:0.001 to 1:1000.

(5) An herbicidal composition including the herbicidal composition according to any one of the above-described sentences (1) to (4) in an amount adequate for exhibiting the activity as an herbicide and at least one liquid carrier and/or solid carrier, and, if necessary, further including at least one surfactant.

(6) The herbicidal composition according to any one of the above-described sentences (1) to (5) having an herbicide injury alleviation effect.

(7) A method for producing an herbicide composition, wherein the herbicide composition according to any one of the above-described sentences (1) to (4) in an amount adequate for exhibiting the activity as an herbicide; at least one liquid carrier and/or solid carrier; and, if necessary, at least one surfactant; are mixed in producing the herbicide composition according to the above-described sentence (5).

(8) A method for controlling the growth of a plant undesirable for a useful plant by applying the herbicide composition according to any one of the above-described sentences (1) to (6) to a useful plant, to land where a useful plant is grown or to be grown, or to non-crop land at one time or separately.

(9) A method for using the herbicide composition according to any one of the above-described sentences (1) to (6) for the sake of controlling the growth of a plant undesirable for a useful plant.

(10) The method for using the herbicide composition according to the above-described sentence (9), wherein the useful plant is small grain cereals.

Effect of the Invention

An herbicide composition of the present invention exhibits a wide weed control spectrum by combining a Component A selected from the group consisting of an oxopyrazine derivative represented by the above Formula X, which is one of the active ingredients, and salts thereof with at least one compound, which is another active ingredient, selected from the above-described Component B. Also, it is possible to reduce the application dosage because not only a simple total of the activities obtained with each single component, but also a weed killing effect and an herbicide injury alleviation effect may be exerted synergistically. Further, it inhibits emergence of various weeds that may be problematic in cultivation in paddy field, dry field, non-crop land, etc. over a long period of time, especially it inhibits emergence of various weeds that may be problematic in cultivation of small grain cereals over a long period of time. Moreover, it does not cause herbicide injury in a useful plant, and it can contribute to labor-saving in cultivation, and increased yield of crops.

An herbicide composition of the present invention has excellent herbicidal efficacy, and some have, for example, excellent selectivity between crops and weeds, and is useful as an agricultural chemical composition on farm land, particularly as an herbicide. That is, an herbicide composition of the present invention exhibits herbicidal activity on various weeds which may be problematic in a foliage treatment, a soil treatment, a seed dressing treatment, a soil incorporation treatment, and a soil treatment before sowing or at time of sowing, a soil treatment after sowing, a soil cover incorporation treatment at time of sowing, etc. in dry field for cultivating agricultural and horticultural plants,

MODES FOR CARRYING OUT THE INVENTION

The present invention will be described in detail below.

A Component A, which is one of the active ingredients of an herbicide composition of the present invention, is selected from the group consisting of an oxopyrazine derivative represented by the following Formula X and salts thereof:

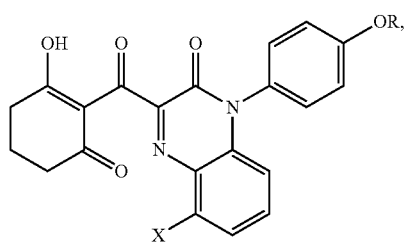

[X]

where R represents a linear or branched lower alkyl group having 1 to 6 carbon atoms, such as a methyl group, an ethyl group, a n-propyl group, an isopropyl group, a n-butyl group, a sec-butyl group, a t-butyl group, a n-pentyl group, and a n-hexyl group, and X represents a halogen atom, such as bromine, chlorine, fluorine and iodine, respectively.

Naturally, two or more kinds of oxopyrazine derivatives or salts thereof may be mixed.

Specific examples of the oxopyrazine derivative of the Formula X used as the Component A include the compound represented by the following Formula I:

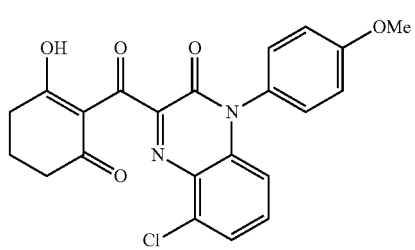

[I]

In the herbicidal composition of the present invention, examples of a known herbicide, a plant growth regulator, or a safener, which is another pesticidal active ingredient of the Component B that can be mixed or used in combination with the oxopyrazine derivative or a salt thereof used in the present invention are described below, but it is not limited to these examples.

Examples of herbicides include a compound selected from ioxynil, aclonifen, acrolein, azafenidin, acifluorfen (including salts such as sodium), azimsulfuron, asulam, acetochlor, atrazine, anilofos, amicarbazone, amidosulfuron, amitrole, aminocyclopyrachlor, aminopyralid, amiprofos-methyl, ametryn, alachlor, alloxydim, ancymidol, isouron, isoxachlortole, isoxaflutole, isoxaben, isodecylalkohol-ethoxylat, isoproturon, ipfencarbazone, imazaquin, imazapic including salts such as amine, imazapyr (including salts such as isopropylamine), imazamethabenz-methyl, imazamox, imazethapyr, imazosulfuron, indaziflam, indanofan, eglinazine-ethyl, esprocarb, ethametsulfuron-methyl, ethalfluralin, ethidimuron, ethoxysulfuron, ethoxyfen-ethyl, ethofumesate, etobenzanid, endothal-disodium, oxadiazon, oxadiargyl, oxaziclomefone, oxasulfuron, oxyfluorfen, oryzalin, orthosulfamuron, orbencarb, oleic acid, cafenstrole, carfentrazone-ethyl, karbutilate, carbetamide, quizalofop, quizalofop-ethyl, quizalofop-P-ethyl, quizalofop-P-tefuryl, quinoclamine, quinclorac, quinmerac, cumyluron, clacyfos, glyphosate (including salts such as sodium, potassium, amine, propylamine, isopropylamine, dimethylamine or trimesium), glufosinate (including salts such as amine or sodium), glufosinate-P, glufosinate-P-sodium, clethodim, clodinafop-propargyl, clopyralid, clomazone, chlomethoxyfen, clomeprop, cloransulam-methyl, chloramben, chloridazon, chlorimuron-ethyl, chlorsulfuron, chlorthal-dimethyl, chlorthiamid, chlorphthalim, chlorflurenol-methyl, chlorpropham, chlorbromuron, chloroxuron, chlorotoluron, ketospiradox (including salts such as sodium, calcium or ammonia), saflufenacil, sarmentine, cyanazine, cyanamide, diuron, diethatyl-ethyl, dicamba (including salts such as amine, diethylamine, isopropylamine, diglycolamine, sodium or lithium), cycloate, cycloxydim, diclosulam, cyclosulfamuron, cyclopyrimorate, dichlobenil, diclofop-P-methyl, diclofop-methyl, dichlorprop, dichlorprop-P, diquat, dithiopyr, siduron, dinitramine, cinidon-ethyl, cinosulfuron, dinoseb, dinoterb, cyhalofop-butyl, diphenamid, difenzoquat, diflufenican, diflufenzopyr, simazine, dimethachlor, dimethametryn, dimethenamid, dimethenamid-P, simetryn, dimepiperate, dimefuron, cinmethylin, swep, sulcotrione, sulfentrazone, sulfosate, sulfosulfuron, sulfometuron-methyl, sethoxydim, terbacil, daimuron, thaxtomin A, dalapon, thiazopyr, tiafenacil, thiencarbazone (including sodium salt, methyl ester, or the like), tiocarbazil, thiobencarb, thidiazimin, thidiazuron, thifensulfuron-methyl, desmedipham, desmetryne, thenylchlor, tebutam, tebuthiuron, tepraloxydim, tefuryltrione, terbuthylazine, terbutryn, terbumeton, tembotrione, topramezone, tralkoxydim, triaziflam, triasulfuron, triafamone, tri-allate, trietazine, triclopyr, triclopyr-butotyl, tritosulfuron, trifludimoxazin, triflusulfuron-methyl, trifluralin, trifloxysulfuron-sodium, tribenuron-methyl, tolpyralate, naptalam (including salts such as sodium), naproanilide, napropamide, napropamide-M, nicosulfuron, neburon, norflurazon, vernolate, paraquat dichloride, halauxifen-benzyl, halauxifen-methyl, haloxyfop, haloxyfop-P, haloxyfop-etotyl, halosafen, halosulfuron-methyl, picloram, picolinafen, bicyclopyrone, bispyribac-sodium, pinoxaden, bifenox, piperophos, pyraclonil, pyrasulfotole, pyrazoxyfen, pyrazosulfuron-ethyl, pyrazolynate, bilanafos, pyraflufen-ethyl, pyridafol, pyrithiobac-sodium, pyridate, pyriftalid, pyributicarb, pyribenzoxim, pyrimisulfan, pyriminobac-methyl, pyroxasulfone, pyroxsulam, phenisopham, fenuron, fenoxasulfone, fenoxaprop (including methyl, ethyl, or isopropyl ester), fenoxaprop-P (including methyl, ethyl, or isopropyl ester), fenthiaprop-ethyl, fentrazamide, phenmedipham, foramsulfuron, butachlor, butafenacil, butamifos, butylate, butenachlor, butralin, butroxydim, flazasulfuron, flamprop (including methyl, ethyl, or isopropyl ester), primisulfuron-methyl, fluazifop-butyl, fluazifop-P-butyl, fluazolate, fluometuron, fluoroglycofen-ethyl, flucarbazone-sodium, fluchloralin, flucetosulfuron, fluthiacet-methyl, flupyrsulfuron-methyl (including salts such as sodium, calcium, or ammonia), flufenpyr-ethyl, flupropanate, flupoxame, flumioxazin, flumiclorac-pentyl, flumetsulam, fluridone, flurtamone, fluroxypyr (including esters such as butomethyl or meptyl, and salts such as sodium, calcium or ammonia), flurochloridone, pretilachlor, procarbazone-sodium, prodiamine, prosulfuron, prosulfocarb, propaquizafop, propachlor, propazine, propanil, propyzamide, propisochlor, propyrisulfuron, propham, profluazol, prohexadione-calcium, propoxycarbazone, propoxycarbazone-sodium, profoxydim, bromacil, brompyrazon, prometryn, prometon, bromoxynil (including esters such as butyric acid, octanoic acid or heptanoic acid), bromofenoxim, bromobutide, florasulam, florpyrauxifen, florpyrauxifen-benzyl, hexazinone, pethoxamid, benazolin, penoxsulam, heptamaloxyloglucan, beflubutamid, pebulate, pelargonic acid, bencarbazone, pendimethalin, benzfendizone, bensulide, bensulfuron-methyl, benzobicyclon, benzofenap, bentazone, pentanochlor, pentoxazone, benfluralin, benfuresate, fosamine, fomesafen, foramsulfuron, forchlorfenuron, mecoprop (including salts such as sodium, potassium, isopropylamine, triethanolamine, or dimethylamine), mecoprop-P-potassium, mesosulfuron (including esters such as methyl), mesotrione, metazachlor, metazosulfuron, methabenzthiazuron, metamitron, metamifop, metam, DSMA, methiozolin, methyldymuron, metoxuron, metosulam, metsulfuron-methyl, metobromuron, metobenzuron, metolachlor, metribuzin, mepiquat chloride, mefenacet, monosulfuron (including methyl, ethyl, or isopropyl ester), monolinuron, molinate, iodosulfuron, iodosulfulon-methyl-sodium, iofensulfuron, iofensulfuron-sodium, lactofen, lancotrione, linuron, rimsulfuron, lenacil, TCA (including salts such as sodium, calcium, or ammonia), 2,3,6-TBA, 2,4,5-T, 2,4-D (including salts such as amine, diethylamine, triethanolamine, isopropylamine, sodium or lithium), ACN, AE-F-150944 (Code number), MCPA, MCPB (including sodium salt, ethyl ester or the like), 2,4-DB, DNOC (including salts such as amine or sodium), MCPA-thioethyl, IR-6396 (Code number), SYP-298 (Code number), SYP-300 (Code number), EPTC, S-metolachlor, S-9750 (Code number), MSMA, and HW-02 (Code number), as well as salts and analogs of these compounds.

[Plant Growth Regulator]

Examples of plant growth regulators include a compound selected from 1-naphthylacetamide, 1-methylcyclopropene, 2,6-diisopropylnaphthalene, 4-CPA, 4-oxo-4-(2-phenylethyl) aminobutyric acid (Chemical Name, CAS Registry Number; 1083-55-2), n-decanol, aviglycine, abscisic acid, ancymidol, inabenfide, indole acetic acid, indole butyric acid, uniconazole, uniconazole-P, Ecolyst, ethychlozate, ethephon, oxine-sulfate, epocholeone, carvone, calcium formate, cloxyfonac, cloxyfonac-potassium, cloprop, chlormequat, choline, cytokinins, cyclanilide, dikegulac, gibberellin acid, dimethipin, sintofen, daminozide, thidiazuron, triacontanol, trinexapac-ethyl, paclobutrazol, paraffin, flumetralin, flurprimidol, flurenol, prohydrojasmon, prohexadione-calcium, heptamaloxyloglucan, benzylaminopurine, forchlorfenuron, maleic hydrazide, mepiquat chloride, mefluidide, and calcium peroxide, as well as salts and analogues of these compounds.

Examples of safeners include a compound selected from isoxadifen, isoxadifen-ethyl, oxabetrinil, cloquintcet-mexyl, dietholate, cyometrinil, dichlormid, dicyclonone, cyprosulfamide, 1,8-naphthalic anhydride, fenchlorazole-O-ethyl, fenclorim, furilazole, fluxofenim, flurazole, benoxacor, mephenate, mefenpyr, mefenpyr-ethyl, mefenpyr-diethyl, lower alkyl substituted benzoic acid, 2,2-dichloro-N-(1,3-dioxan-2-ylmethyl)-N-(2-propenyl)acetamide (PPG-1292), 2-dichloromethyl-2-methyl-1,3-dioxane (MG-191), 3-dichloroacetyl-2,2,5-trimethyl-1,3-oxazolidine (R-29148), 4-dichloroacetyl-1-oxa-4-azaspiro[4.5]decane (AD-67), MON4660 (Code number), N-(2-methoxybenzoyl)-4-[(methylaminocarbonyl)amino]benzenesulfonamide (chemical name, CAS Registry Number: 129531-12-0), N1,N2-diallyl-N2-dichloroacetyl glycinamide (DKA-24), TI-35 (Code number), and compounds represented by Formulas [III] and [IV] below, as well as salts and analogues of these compounds:

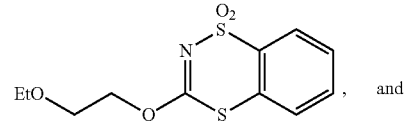

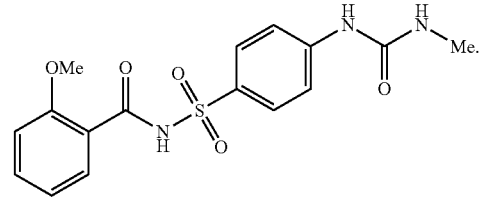

All of the above Component B are compounds described in Patent Documents 1 to 3 or Non Patent Documents 1 to 4. Among others, a compound selected from the following compounds, glyphosate-ammonium salt, benfluralin, bromoxynil, carfentrazone-ethyl, chlorpropham, chlorotoluron, clethodim, cloquintocet-mexyl, clopyralid, dicamba, diflufenican, florasulam, flufenacet, flumioxazin, fluroxypyr, fluroxypyr-meptyl, flupyrsulfuron-methyl, imazosulfuron, isodecyl alcohol ethoxylate, isoproturon, isoxaben, isoxaflutole, iodosulfuron, glyphosate potassium salt, maleic hydrazide, MCPA, mecoprop-P potassium salt, mesosulfuron-methyl, metsulfuron-methyl, nicosulfuron, pelargonic acid, pendimethalin, bentazon, pinoxaden, propyzamide, prosulfocarb, picolinafen, pyrasulfotole, pyraflufen-ethyl, pyroxasulfone, pyroxsulam, quinoclamine, quizalofop-P-tefuryl, quizalofop-ethyl, fentrazamide, rimsulfuron, sulfosulfuron, thifensulfuron-methyl, tri-allate, tribenuron-methyl, ioxynil, bicyclopyrone, and halauxifen-methyl, as well as salts thereof and analogues thereof are preferred. These may be used singly or in combination of two or more kinds thereof.

The ratio of the two components in an herbicide composition of the present invention varies depending on the target scene, target crop, type of weed or weed condition, application time, application method, formulation type, and the like. If necessary, the mixing ratio, or the application dosage may be changed in a wide range.

In general, the blending ratio of the Component A to the Component B is 1:0.001 to 1000, preferably 1:0.01 to 500, more preferably 1:0.05 to 500, and especially preferably 1:0.05 to 100 in terms of mass ratio.

In using an herbicide composition of the present invention, the active ingredients per se may be used, but it is also favorable to use a formulation, such as a powder, a wettable powder formulation, a water dispersible granule formulation, a flowable formulation, an emulsion formulation, a liquid formulation, a microgranule, and a granule, formulated with an herbicide composition so much as to exhibit the activity necessary for an herbicide, and if necessary together with additive ingredients which are commonly used in an agrochemical formulation. Preferably, the formulation comprises an herbicide composition so much as to exhibit the activity necessary for an herbicide, at least one liquid carrier and/or solid carrier, and preferably at least one inert liquid carrier and/or solid carrier, as well as optionally at least one surfactant.

Examples of the additive ingredient include a carrier such as a solid carrier, and a liquid carrier, a surfactant, a binder, a tackifier, a thickener, a colorant, a spreading agent, a wetting agent, an antifreezing agent, an anticaking agent, a disintegrating agent, a stabilizing agent, and an antifoaming agent. Further, if necessary, a preservative, a plant fragment, or the like may be used as an additive ingredient. These additive ingredients may be used singly or in combination of two or more kinds thereof.

Examples of the solid carrier include natural minerals, such as quartz, clay, silica sand, kaolinite, pyrophyllite, sericite, talc, bentonite, acid clay, attapulgite, zeolite, diatomaceous earth, inorganic salts, such as calcium carbonate, ammonium sulfate, sodium sulfate, and potassium chloride, organic solid carriers, such as synthetic silicic acid, synthetic silicate, starch, cellulose, and a vegetable powder, plastic carriers, such as polyethylene, polypropylene, and poly (vinylidene chloride), urea, inorganic hollow beads, plastic hollow beads, and fumed silica (white carbon). These may be used singly or in combination of two or more kinds thereof.

Examples of the liquid carrier include alcohols including monohydric alcohols, such as methanol, ethanol, propanol, isopropanol, and butanol, and polyhydric alcohols, such as ethylene glycol, diethylene glycol, propylene glycol, hexylene glycol, poly(ethylene glycol), poly(propylene glycol), and glycerin; polyhydric alcohol derivatives such as propylene glycol ether; ketones, such as acetone, ethyl methyl ketone, methyl isobutyl ketone, diisobutyl ketone, and cyclohexanone; ethers, such as ethyl ether, dioxane, ethylene glycol monoethyl ether, dipropyl ether, and tetrahydrofuran; aliphatic hydrocarbons, such as normal paraffin, naphthene, isoparaffin, kerosene, and mineral oil; aromatic hydrocarbons, such as benzene, toluene, xylene, solvent naphtha, an alkylbenzene, and an alkylnaphthalene; halogenated hydrocarbons, such as dichloromethane, chloroform, and carbon tetrachloride; esters, such as ethyl acetate, diisopropyl phthalate, dibutyl phthalate, dioctyl phthalate, and dimethyl adipate; lactones such as y-butyrolactone; amides, such as dimethyl formamide, diethyl formamide, dimethyl acetamide, and N-alkylpyrrolidinone; nitriles such as acetonitrile; and sulfur compounds, such as dimethylsulfoxide; vegetable oils, such as soybean oil, rapeseed oil, cottonseed oil, and castor oil; and water. These may be used singly or in combination of two or more kinds thereof.

Examples of the surfactant include nonionic surfactants, such as a sorbitan fatty acid ester, a polyoxyethylene sorbitan fatty acid ester, a sucrose fatty acid ester, a polyoxyethylene fatty acid ester, a polyoxyethylene resin acid ester, a polyoxyethylene fatty acid diester, a polyoxyethylene alkyl ether, a polyoxyethylene alkyl aryl ether such as a polyoxyethylene alkyl phenyl ether, a polyoxyethylene dialkyl phenyl ether, a polyoxyethylene alkyl phenyl ether formaldehyde condensate, a polyoxyethylene polyoxypropylene block copolymer, an alkyl polyoxyethylene polypropylene block copolymer ether, a polyoxyethylene alkylamine, a polyoxyethylene fatty acid amide, a polyoxyethylene fatty acid bis(phenyl ether), a polyalkylene benzyl phenyl ether, a polyoxyalkylene styryl phenyl ether, acetylene diol, a polyoxyalkylene-added acetylene diol, a polyoxyethylene ether type silicone, an ester type silicone, a fluorochemical surfactant, a polyoxyethylene castor oil, and a polyoxyethylene hardened castor oil; anionic surfactants, such as an alkyl sulfate, a polyoxyethylene alkyl ether sulfate, a polyoxyethylene alkyl phenyl ether sulfate, a polyoxyethylene styryl phenyl ether sulfate, an alkylbenzene sulfonate, a lignin sulfonate, an alkyl sulfosuccinate, naphthalene sulfonate, an alkylnaphthalene sulfonate, a salt of naphthalene sulfonic acid formaldehyde condensate, a salt of alkylnaphthalene sulfonic acid formaldehyde condensate, a fatty acid salt, polycarboxylate, n-methyl-fatty acid sarcosinate, a resin acid salt, a polyoxyethylene alkyl ether phosphate, and a polyoxyethylene alkylphenyl ether phosphate; cationic surfactants such as alkylamine salts including laurylamine hydrochloride, stearylamine hydrochloride, oleylamine hydrochloride, stearylamine acetate, stearylaminopropylamine acetate, an alkyltrimethylammonium chloride, and an alkyldimethylbenzalkonium chloride; and amino acid type or betaine type amphoteric surfactants. These surfactants may be used singly or in combination of two or more kinds thereof.

Examples of the binder or tackifier include carboxymethylcellulose and a salt thereof, dextrin, water-soluble starch, xanthan gum, guar gum, sucrose, poly(vinyl pyrrolidone), gum arabic, poly(vinyl alcohol), poly(vinyl acetate), poly (sodium acrylate), polyoxyethylene having an average molecular weight of 6,000 to 5,000,000, and a phospholipid (such as cephalin, and lecithin). These binders and tackifiers may be used singly or in combination of two or more kinds thereof.

Examples of the thickener include water-soluble polymers, such as xanthan gum, guar gum, carboxymethylcellulose, poly(vinyl pyrrolidone), a carboxyvinyl polymer, an acrylic polymer, a starch derivative, and a polysaccharide, and inorganic fine particles, such as high purity bentonite, and fumed silica (white carbon). These thickeners may be used singly or in combination of two or more kinds thereof.

Examples of the colorant include inorganic pigments, such as iron oxide, titanium oxide, and Prussian blue, and organic dyes, such as an alizarin dye, an azo dye, and a metal phthalocyanine dye. These colorants may be used singly or in combination of two or more kinds thereof.

Examples of the spreading agent include cellulose powder, dextrin, modified starch, polyamino carboxylic acid chelate compound, crosslinked poly(vinyl pyrrolidone), a copolymer of maleic acid and styrene, a (meth)acrylic acid copolymer, a half ester of a polymer of a polyhydric alcohol and a dicarboxylic anhydride, and a water soluble salt of poly(styrenesulfonic acid). These spreading agents may be used singly or in combination of two or more kinds thereof.

Examples of the wetting agent include paraffin, terpene, a polyamide resin, polyacrylate, polyoxyethylene, wax, a polyvinyl alkyl ether, an alkylphenol formaldehyde condensate, a phosphate ester of starch, and a synthetic resin emulsion. These wetting agents may be used singly or in combination of two or more kinds thereof.

Examples of the antifreezing agent include polyhydric alcohols, such as ethylene glycol, diethylene glycol, propylene glycol, and glycerin. These antifreezing agents may be used singly or in combination of two or more kinds thereof.

Examples of the anticaking agent include polysaccharides, such as starch, alginic acid, mannose, and galactose, poly(vinyl pyrrolidone), fumed silica (white carbon), ester gum, and a petroleum resin. These anticaking agents may be used singly or in combination of two or more kinds thereof.

Examples of the disintegrating agent include sodium tripolyphosphate, sodium hexametaphosphate, a stearic acid metal salt, cellulose powder, dextrin, a methacrylic acid ester copolymer, poly(vinyl pyrrolidone), a polyamino carboxylic acid chelate compound, a sulfonated styrene-isobutylene-maleic anhydride copolymer, and a starch-polyacrylonitrile graft copolymer. These disintegrating agents may be used singly or in combination of two or more kinds thereof.

Examples of the stabilizing agent include desiccants, such as zeolite, quicklime, and magnesium oxide, antioxidants, such as a phenol compound, an amine compound, a sulfur compound, and a phosphate compound, and ultraviolet absorbers, such as a salicylic acid compound, and a benzophenone compound. These stabilizing agents may be used singly or in combination of two or more kinds thereof.

Examples of the antifoaming agent include dimethylpolysiloxane, a modified silicone, a polyether, a fatty acid ester, and a fatty acid salt. These antifoaming agents may be used singly or in combination of two or more kinds thereof.

Examples of the preservative include sodium benzoate, sodium parahydroxybenzoate, potassium sorbate, and 1,2-benzothiazolin-3-one. These preservatives may be used singly or in combination of two or more kinds thereof.

Examples of the plant fragment include sawdust, coconut shell, corn cob, and tobacco stem. These plant fragments may be used singly or in combination of two or more kinds thereof.

When the additive ingredients are added to an herbicide composition of the present invention, the blend ratio based on mass is selected in a range of ordinarily from 5 to 95%, and preferably from 20 to 90% for the carrier, ordinarily from 0.1 to 30%, and preferably from 0.5 to 10% for the surfactant, and ordinarily from 0.1 to 30%, and preferably from 0.5 to 10% for another additive ingredient.

If necessary, an herbicide composition of the present invention may be mixed with an insecticide, a fungicide, another herbicide, another plant growth regulator, another safener, a microorganism, a fertilizers, etc.

Examples of a pesticide active ingredient or a fungicide active ingredient that can be mixed with an herbicide composition are described below, but the present invention is not limited to these agrochemical active ingredients.

[Pesticide Active Ingredient]

Example of pesticide active ingredients include acrinathrin, azadirachtin, azamethiphos, acynonapyr, azinphos-ethyl, azinphos-methyl, acequinocyl, acetamiprid, acetoprole, acephate, azocyclotin, abamectin, afidopyropen, afoxolaner, amidoflumet, amitraz, alanycarb, aldicarb, aldoxycarb, allethrin [including d-cis-trans-isomer or d-trans-isomer], isazophos, isamidofos, isocarbophos, isoxathion, isofenphos-methyl, isoprocarb, ivermectin, imicyafos, imidacloprid, imiprothrin, indoxacarb, esfenvalerate, ethiofencarb, ethion, ethiprole, ethylene dibromide, etoxazole, etofenprox, ethoprophos, etrimfos, emamectin benzoate, endosulfan, empenthrin, oxamyl, oxydemeton-methyl, oxydeprofos, omethoate, cadusafos, kappa-tefluthrin, kappa-bifenthrin, karanjin, cartap, carbaryl, carbosulfan, carbofuran, gamma-BHC, xylylcarb, quinalphos, kinoprene, chinomethionat, coumaphos, cryolite, clothianidin, clofentezine, chromafenozide, chlorantraniliprole, chlorethoxyfos, chlordane, chloropicrin, chlorpyrifos, chlorpyrifos-methyl, chlorfenapyr, chlorfenvinphos, chlorfluazuron, chlormephos, chloroprallethrin, cyanophos, diafenthiuron, diamidafos, cyantraniliprole, dienochlor, cyenopyrafen, dioxabenzofos, diofenolan, cyclaniliprole, dicrotophos, dichlofenthion, cycloprothrin, dichlorvos, 1,3-dichloropropene, dichloromezotiaz, dicofol, dicyclanil, disulfoton, dinotefuran, dinobuton, cyhalodiamide, cyhalothrin [including gamma-isomer or lamda-isomer], cyphenothrin [including (IR)-trans-isomer], cyfluthrin [including beta-isomer], diflubenzuron, cyflumetofen, diflovidazin, cyhexatin, cypermethrin [including alpha-isomer, beta-isomer, theta-isomer, or zeta-isomer], dimethylvinphos, dimefluthrin, dimethoate, silafluofen, cyromazine, spinetoram, spinosad, spirodiclofen, spirotetramat, spiromesifen, sulcofuron-sodium, sulfluramid, sulfoxaflor, sulfotep, diazinon, thiacloprid, thiamethoxam, tioxazafen, thiodicarb, thiocyclam, thiosultap, thionazin, thiofanox, thiometon, tetrachlorvinphos, tetradifon, tetraniliprole, tetramethylfluthrin, tetramethrin, tebupirimfos, tebufenozide, tebufenpyrad, tefluthrin, teflubenzuron, demeton-S-methyl, temephos, deltamethrin, terbufos, tralomethrin, transfluthrin, triazamate, triazophos, trichlorfon, triflumuron, triflumezopyrim, trimethacarb, tolfenpyrad, naled, nitenpyram, novaluron, noviflumuron, *Verticillium* lecanii, hydroprene, Pasteuriapenetrans, vamidothion, parathion, parathion-methyl, halfenprox, halofenozide, bioallethrin, bioallethrin S-cyclopentenyl, bioresmethrin, bistrifluron, hydramethylnon, bifenazate, kappa-bifenthrin, pyflubumide, piperonyl butoxide, pymetrozine, pyraclofos, pyrafluprole, pyridaphenthion, pyridaben, pyridalyl, pyrifluquinazon, pyriprole, pyriproxyfen, pirimicarb, pyrimidifen, pyriminostrobin, pirimiphos-methyl, pyrethrine, famphur, fipronil, fenazaquin, fenamiphos, fenitrothion, fenoxycarb, fenothiocarb, phenothrin [including (IR)-trans-isomer], fenobucarb, fenthion, phenthoate, fenvalerate, fenpyroximate, fenbutatin oxide, fenpropathrin, fonofos, sulfuryl fluoride, butocarboxim, butoxycarboxim, buprofezin, furathiocarb, prallethrin, fluacrypyrim, fluazaindolizine, fluazuron, fluensulfone, sodium fluoroacetate, fluxametamide, flucycloxuron, flucythrinate, flusulfamide, fluvalinate [including tau-isomer], flupyradifurone, flupyrazofos, flupyrimin, flufiprole, fluhexafon, flufenerim, flufenoxystrobin, flufenoxuron, flubendiamide, flumethrin, fluralaner, prothiofos, protrifenbute, flonicamid, propaphos, propargite, profenofos, broflanilide, profluthrin, propetamphos, propoxur, flometoquin, bromopropylate, hexythiazox, hexaflumuron, Pacilimyces tenuipes, *Paecilomyces* fumosoroceus, heptafluthrin, heptenophos, permethrin, benclothiaz, benzpyrimoxan, bensultap, benzoximate, bendiocarb, benfuracarb, *Beauveria tenella, Beauveria bassiana, Beauveria*

*brongniartii*, phoxim, phosalone, fosthiazate, fosthietan, phosphamidon, phosmet, polynactins, formetanate, phorate, malathion, milbemectin, mecarbam, mesulfenfos, methomyl, metaflumizone, methamidophos, metham, methiocarb, methidathion, methyl isothiocyanate, methyl bromide, methoxychlor, methoxyfenozide, methothrin, metofluthrin, epsilon-metofluthrin, methoprene, metolcarb, mevinphos, meperfluthrin, *Monacrosporium phymatophagum*, monocrotophos, momfluorothrin, epsilon-momfluorothrin, litlure-A, litlure-B, aluminium phosphide, zinc phosphide, phosphine, lufenuron, rescalure, resmethrin, lepimectin, rotenone, fenbutatin oxide, calcium cyanide, nicotine-sulfate, (Z)-11-tetradecenyl acetate, (Z)-11-hexadecenal, (Z)-11-hexadecenyl acetate, (Z)-9,12-tetradecadienyl acetate, (Z)-9-tetradecene-1-ol, (Z, E)-9,11-tetradecadienyl acetate, (Z, E)-9,12-tetradecadienyl acetate, *Bacillus popilliae, Bacillus subtillis, Bacillus sphaericus, Bacillus thuringiensis* subsp. *Aizawai, Bacillus thuringiensis* subsp. *Israelensis, Bacillus thuringiensis* subsp. Kurstaki, *Bacillus thuringiensis* subsp. Tenebrionis, Bt protein (Cry1Ab, Cry1Ac, Cry1Fa, Cry2Ab, mCry3A, Cry3Ab, Cry3Bb, Cry34/35 Abl), CL900167 (Code number), DCIP, DDT, DEP, DNOC, DSP, EPN, nuclear polyhedrosis virus embedded body, NA-85 (Code number), RU15525 (Code number), XMC, Z-13-icosen-10-one, ZXI8901 (Code number), ME5382 (Code number).

[Fungicide Active Ingredient]

Examples of fungicide active ingredient include azaconazole, acibenzolar-S-methyl, azoxystrobin, anilazine, amisulbrom, ametoctradin, aldimorph, isotianil, isopyrazam, isofetamid, isoflucypram, isoprothiolane, ipconazole, ipfentrifluconazole, iprodione, iprovalicarb, iprobenfos, imazalil, iminoctadine-albesilate, iminoctadine-triacetate, imibenconazole, edifenphos, etaconazole, ethaboxam, ethirimol, ethoxyquin, etridiazole, enestroburin, enoxastrobin, epoxiconazole, organic oils, oxadixyl, oxazinylazole, oxathiapiprolin, oxycarboxin, oxine-copper, oxytetracycline, oxpoconazole-fumarate, oxolinic acid, copper dioctanoate, octhilinone, ofurace, orysastrobin, o-phenylphenol, kasugamycin, captafol, carpropamid, carbendazim, carboxin, carvone, quinoxyfen, quinofumelin, chinomethionat, captan, quinconazole, quintozene, guazatine, cufraneb, coumoxystrobin, kresoxim-methyl, clozylacon, chlozolinate, chlorothalonil, chloroneb, cyazofamid, diethofencarb, diclocymet, dichlofluanid, dichlobentiazox, diclomezine, dicloran, dichlorophen, dithianon, diniconazole, diniconazole-M, zineb, dinocap, dipymetitrone, diphenylamine, difenoconazole, cyflufenamid, diflumetorim, cyproconazole, cyprodinil, simeconazole, dimethirimol, dimethyl disulfide, dimethomorph, cymoxanil, dimoxystrobin, ziram, silthiofam, streptomycin, spiroxamine, sedaxane, zoxamide, dazomet, tiadinil, thiabendazole, thiram, thiophanate, thiophanate-methyl, thifluzamide, tecnazene, tecloftalam, tetraconazole, debacarb, tebuconazole, tebufloquin, terbinafine, dodine, dodemorph, triadimenol, triadimefon, triazoxide, trichlamide, triclopyricarb, tricyclazole, triticonazole, tridemorph, triflumizole, trifloxystrobin, triforine, tolylfluanid, tolclofos-methyl, tolnifanide, tolprocarb, nabam, natamycin, naftifine, nitrapyrin, nitrothal-isopropyl, nuarimol, copper nonyl phenol sulphonate, *Bacillus subtilis* (strain: QST 713), validamycin, valifenalate, picarbutrazox, bixafen, picoxystrobin, pydiflumetofen, bitertanol, binapacryl, biphenyl, piperalin, hymexazol, pyraoxystrobin, pyraclostrobin, pyraziflumid, pyrazophos, pyrametostrobin, pyriofenone, pyrisoxazole, pyrifenox, pyributicarb, pyribencarb, pyrimethanil, pyroquilon, vinclozolin, ferbam, famoxadone, phenazine oxide, fenamidone, fenaminstrobin, fenarimol, fenoxanil, ferimzone, fenpiclonil, fenpicoxamid, fenpyrazamine, fenbuconazole, fenfuram, fenpropidin, fenpropimorph, fenhexamid, folpet, phthalide, bupirimate, fuberidazole, blasticidin-S, furametpyr, furalaxyl, furancarboxylic acid, fluazinam, fluindapyr, fluoxastrobin, fluopicolide, fluopyram, fluoroimide, fluxapyroxad, fluquinconazole, furconazole, furconazole-cis, fludioxonil, flusilazole, flusulfamide, flutianil, flutolanil, flutriafol, flufenoxystrobin, flumetover, flumorph, proquinazid, prochloraz, procymidone, prothiocarb, prothioconazole, bronopol, propamocarb-hydrochloride, propiconazole, propineb, probenazole, bromuconazole, flometoquin, hexaconazole, benalaxyl, benalaxyl-M, benodanil, benomyl, pefurazoate, penconazole, pencycuron, benzovindiflupyr, benthiazole, benthiavalicarb-isopropyl, penthiopyrad, penflufen, boscalid, fosetyl (alminium, calcium, sodium), polyoxin, polycarbamate, Bordeaux mixture, mancozeb, mandipropamid, mandestrobin, maneb, myclobutanil, mineral oils, mildiomycin, methasulfocarb, metam, metalaxyl, metalaxyl-M, metiram, metconazole, metominostrobin, metrafenone, mepanipyrim, mefentrifluconazole, meptyldinocap, mepronil, iodocarb, laminarin, phosphorous acid and salts, copper oxychloride, silver, cuprous oxide, copper hydroxide, potassium bicarbonate, sodium bicarbonate, sulfur, oxyquinoline sulfate, copper sulfate, (3,4-dichloroisothiazol-5-yl) methyl 4-(tert-butyl)benzoate (chemical name, CAS Registry Number: 1231214-23-5), BAF-045 (Code number), BAG-010 (Code number), UK-2A (Code number), DBEDC, MIF-1002 (Code number), NF-180 (Code number), TPTA, TPTC, TPTH, or nonpathogenic *Erwinia carotovora*.

In use, an herbicide composition of the present invention may be applied directly or may be diluted to a concentration appropriate for the purpose of use, and used by foliage application, application on soil, application on water surface, or the like. Meanwhile, an herbicide composition of the present invention may be used after preliminarily mixing of a Component A and a Component B, or may be used sequentially according to the purpose. It may also be used as a formulation of herbicide composition.

The amount of the active ingredients in the formulation of an herbicide composition of the present invention is appropriately selected according to need, and in the case of a powder, microgranule, or granule, it is preferably selected in a range of from 0.01 to 90% (mass), and preferably from 0.05 to 50% (mass). In the case of an emulsion formulation, a liquid formulation, a flowable formulation, a wettable powder formulation, or a water dispersible granule formulation, it is preferably selected in a range of from 1 to 90% (mass), and preferably from 5 to 80% (mass).

The application dosage of an herbicide composition of the present invention varies depending on the type of an active ingredient to be used, the target weed, its emergence tendency, environmental conditions, or a formulation type used.

In the case of a powder, microgranule, or granule, the active ingredient amount per 10 a is selected in the range of from 0.1 g to 5 kg, and preferably from 0.5 g to 1 kg.

When an emulsion formulation, a liquid formulation, a flowable formulation, a wettable powder formulation, a water dispersible granule formulation, or the like is diluted in water and used, the concentration of active ingredients at the time of use is generally selected in the range of from 10 to 100,000 ppm.

An herbicide composition of the present invention prepared in this way is capable of controlling the growth of a plant undesirable for a useful plant, especially small grain cereals, through application by one-time administration or fractionated administrations to field where a useful plant, especially small grain cereals, is supposed to be grown, or is grown, or to non-crop land.

The term "small grain cereals" referred to in the present invention includes a plant which is imparted by means of a classical breeding method, or a genetic recombination technique with resistance to an HPPD inhibitor such as isoxaflutole, an ALS inhibitor such as imazethapyr, and thifensulfuron-methyl, an EPSP synthase inhibitor such as glyphosate, a glutamine synthase inhibitor such as glufosinate, an acetyl CoA carboxylase inhibitor such as sethoxydim, a PPO inhibitor such as flumioxazin, and an herbicide such as bromoxynil, dicamba, and 2,4-D.

As examples of an "agricultural or horticultural plant" imparted with resistance by means of a classical breeding method, there are rape, wheat, sunflower, rice, and corn that are resistant to an imidazolinone based ALS inhibiting herbicide such as imazethapyr, which is already on the market under the trade name of Clearfield®.

Similarly, there is soybean resistant to a sulfonylurea based ALS-inhibiting herbicide, such as thifensulfuron-methyl developed by means of a classical breeding method, which is already on the market under the trade name of STS soybean. Similarly, as an example of an agricultural or horticultural plant imparted with resistance to an acetyl CoA carboxylase inhibitor such as a trioneoxime based, or aryloxyphenoxypropionic acid based herbicide by means of a classical breeding method, there is SR corn, or the like. Agricultural or horticultural plants imparted with resistance to an acetyl CoA carboxylase inhibitor are described in Proc. Natl. Acad Sci., USA) vol. 87, p. 7175-7179 (1990), etc. Further, a mutated acetyl CoA carboxylase resistant to an acetyl CoA carboxylase inhibitor has been reported in Weed Science vol. 53, p. 728-746 (2005), etc. By introducing the gene of such a mutated acetyl CoA carboxylase into a plant by means of a genetic recombination technique, or by introducing a mutation related to impartation of the resistance into a crop acetyl CoA carboxylase, a plant resistant to an acetyl CoA carboxylase inhibitor can be created. Further, by introducing a nucleic acid having introduced a base substitution mutation into a plant cell typically by a chimeraplasty (Gura T., Repairing the Genome's Spelling Mistakes, Science 285: 316-318 (1999)) to induce a site-specific amino acid substitution mutation in a gene of a crop (acetyl CoA carboxylase/herbicide target) so that a plant resistant to an acetyl CoA carboxylase inhibitor/an herbicide can be created.

Examples of an agricultural or horticultural plant imparted with resistance by a genetic recombination technology include cultivars of corn, soybean, cotton, rape, and sugar beet resistant to glyphosate, which are already on the market under the trade names such as Roundup Ready®, and Agrisure GT®. Similarly, there are cultivars of corn, soybean, cotton, and rape having acquired resistance to glufosinate by a genetic recombination technology, which are already on the market under the trade names such as LibertyLink®. Similarly, cotton having acquired resistance to bromoxynil by a genetic recombination technology is already on the market under the trade name of BXN.

The "agricultural or horticultural plant" includes, for example, a plant which has acquired capability of synthesizing a selective toxin, etc., known as *Bacillus* genus using a genetic recombination technology.

Examples of an insecticidal toxin expressed in such a genetically modified plant include insecticidal proteins derived from *Bacillus cereus* or *Bacillus popilliae*; insecticidal proteins including δ-endotoxins, such as Cry1Ab, Cry1Ac, Cry1F, Cry1Fa2, Cry2Ab, Cry3A, Cry3Bb1, and Cry9C, VIP1, VIP2, VIP3, and VIP3A, derived from *Bacillus thuringiensis*; an insecticidal protein derived from a nematode; toxins produced by an animal, such as scorpion toxin, spider toxin, bee toxin, and insect specific neurotoxins; toxins of filamentous fungi; a plant lectin; agglutinin; protease inhibitors, such as a trypsin inhibitor, a serine protease inhibitor, patatin, cystatin, and a papain inhibitor; ribosome inactivating proteins (RIP), such as ricin, corn-RIP, abrin, saporin, and bryodin; steroid metabolizing enzymes, such as a 3-hydroxysteroid oxidase, an ecdysteroid-UDP-glucosyltransferase, and a cholesterol oxidase; an ecdysone inhibitor; a HMG-CoA reductase; an ion channel inhibitor, such as a sodium channel inhibitor, and a calcium channel inhibitor; a juvenile hormone esterase; a diuretic hormone receptor; a stilbene synthase; a bibenzyl synthase; a chitinase; and a glucanase.

Toxins expressed in such a genetically modified plant include also a hybrid toxin between a δ-endotoxin protein, such as Cry1Ab, Cry1Ac, Cry1F, Cry1Fa2, Cry2Ab, Cry3A, Cry3Bb1, Cry9C, or the like, and an insecticidal protein, such as VIP1, VIP2, VIP3, VIP3A, or the like; a partially deficient toxin; and a modified toxin. The hybrid toxin may be produced by a new combination of different domains of these proteins using a recombination technique. As the partially deficient toxin, Cry1Ab in which a part of the amino acid sequence is deficient is known. In the modified toxin one or more of the amino acids of a naturally occurring toxin are substituted.

Examples of these toxins and recombinant plants capable of synthesizing the toxins are described in patent documents, for example, EP-A-0374753, WO 93/07278, WO 95/34656, EP-A-0427299, EP-A-451878, and WO 03/052073. The toxins contained in these recombinant plants impart resistance particularly to Coleopteran insect pests, Diptera insect pests, and Lepidoptera insect pests to plants.

Also, genetically modified plants containing one or more insecticidal pest resistance genes, and expressing one or more toxins are already known, and some of them are on the market. Examples of the genetically modified plants include YieldGard® (corn variety expressing Cry1Ab toxin), YieldGard Rootworm® (corn variety expressing Cry3Bb1 toxin), YieldGard Plus® (corn variety expressing Cry1Ab toxin, and Cry3Bb1 toxin), Herculex® I (corn variety expressing Cry1Fa2 toxin, and phosphinothricin N-acetyltransferase (PAT) for imparting resistance to glufosinate), NuCOTN 33B® (cotton variety expressing Cry1Ac toxin), Bollgard I® (cotton variety expressing Cry1Ac toxin), Bollgard II® (cotton variety expressing Cry1Ac toxin and Cry2Ab toxin), VIPCOT® (cotton variety expressing a VIP toxin), NewLeaf® (potato variety expressing Cry3A toxin), NatureGard® Agrisure® GT Advantage (trait resistant to GA21 glyphosate), Agrisure® CB Advantage (Bt 11 corn borer (CB) trait), and Protecta®.

The above useful plants also include those imparted with the ability to produce an anti-virulent substance having a selective activity using a genetic recombination technology.

Examples of the anti-virulent substance include PR proteins (PRPs, described in EP-A-0392225); ion channel inhibitors, such as a sodium channel inhibitor, and a calcium channel inhibitor (toxins KP1, KP4, KP6, etc. produced by a virus have been known); a stilbene synthase; a bibenzyl synthase; a chitinase; a glucanase; and substances produced by a microorganism, such as a peptide antibiotic, an antibiotic having a heterocycle, and a protein factor involved in plant disease resistance (which is called as plant disease resistance gene, and described in WO 03/000906). Such anti-virulent substances, and genetically modified plants which produce the same are described in EP-A-0392225, WO 95/33818, EP-A-0353191, etc.

The above useful plants also include crops which have been imparted with a useful trait, such as an oil component modification trait, and an amino acid content enhancement trait, using a genetic recombination technology. Examples thereof include VISTIVE® (a low linolenic soybean with a reduced linolenic acid content), and a high-lysine (high-oil) corn (a corn with an increased content of lysine or oil).

Further included is a stacked variety combining two or more useful traits of the above classic herbicide trait or herbicide resistance gene, insecticidal pest resistance gene, gene for producing an anti-virulent substance, oil component modification trait, and amino acid content enhancement trait.

As described above, the herbicidal composition of the present invention has herbicidal activity against various weeds. The weeds are exemplified below, but the present invention is not limited to these examples.

Onagraceae: *Oenothera erythrosepala, Oenothera laciniate;*
Ranunculaceae: *Ranunculus muricatus, Ranunculus sardous;*
Polygonaceae: *Polygonum convolvulus, Polygonum lapathifolium, Polygonum pensylvanicum, Polygonum persicaria, Rumex crispus, Rumex obtusifolius, Poligonum cuspidatum, Polygonum pensylvanicum, Persicaria longiseta, Persicaria lapathifolia, Persicaria nepalensis, Polygonum aviculare;*
Portulacaceae: *Portulaca oleracea;*
Caryophyllaceae: *Stellaria media, Cerastium glomeratum, Stellaria alsine, Spergula arvensis, Stellaria aquatica;*
Chenopodiaceae: *Chenopodium album, Kochia scoparia, Chenopodium album, Chenopodium ficifolium, Salsola kali;*
Amaranthaceae: *Amaranthus retroflexus, Amaranthus hybridus, Amaranthus palmeri, Amaranthus spinosus, Amaranthus rudis, Amaranthus albus, Amaranthus viridis, Amaranthus lividus, Amaranthus patulus, Amaranthus blitoides,* Smooth Pigweed (*Amaranthus hybridus*), Tall Waterhemp (*Amaranthus tuberculatus*), Powell Amaranth (*Amaranthus powelii*);
Brassicaceae: *Raphanus raphanistrum, Sinapis arvensis, Capsella bursa-pastoris, Lepidium virginicum, Thlaspi arvense, Descurarinia sophia, Rorippa indica, Rorippa islandica, Sisymnrium officinale, Cardamine flexuosa, Nasturtium officinale, Draba nemorosa;*
Leguminosae: *Sesbania exaltata, Cassia obtusifolia, Desmodium tortuosum, Trifolium repens, Vicia sativa, Medicago lupulina, Vicia* hirsute, *Kummerowia striata, Medicago polymorpha, Vicia angustifolia,* Aeschynomene indica;
Malvaceae: *Abutilon theophrasti, Sida spinosa;*
Violaceae: *Viola arvensis,* Viola tricolor;
Rubiaceae: *Galium spurium, Galium aparine;*
Convolvulaceae: *Ipomoea hederacea, Ipomoea purpurea, Ipomoea hederacea var integriuscula, Ipomoea lacunose, Convolvulus arvensis, Ipomoea indica, Ipomoea coccinea, Ipomoea trilobal;*
Lamiaceae: *Lamium purpureum, Lamium amplexicaule, Stachys arvensis;*
Solanaceae: *Datura stramonium, Solanum nigrum, Physalis angulate, Solanum americanum, Solanum carolinense;*
Scrophulariaceae: *Veronica persica, Veronica arvensis, Veronica hederaefolia;*
Asteraceae: *Xanthium pensylvanicum, Helianthus annuus, Matricaria chamomilla, Matricaria perforata* or *inodora, Chrysanthemum segetum, Matricaria matricarioides, Ambrosia artemisiifolia, Ambrosia trifida, Erigeron canadensis, Artemisia princeps, Artemeisia vulgaris, Solidago altissima, Taraxacum officinale, Anthemis cotula, Cirsium arvense, Sonchus oleraceus, Helianthus tuberosus, Cirsium arvense, Bidens frondosa, Bidens pilosa, Centurea cyanus, Cirsium vulgare, Lactuca scariola, Rudbeckia hirta, Rudbeckia laciniate, Rudbeckia laciniata* var. *hortensis Bailey, Senecio vulgais, Silybum marianum, Sonchus asper, Sonchus arvensis, Bidens ftondosa, Eclipta ptostrata, Bidense tipartita, Senecio madagascariensis, Coreopsis lanceolate, Rudbeckia laciniate;*
Boraginaceae: *Myosotis arvensis, Myosotis arvensis, Lithospermum officinale;*
Asclepiadaceae: *Asclepias syriaca;*
Euphorbiaceae: *Euphorbia helioscopia, Euphorbia maculate, Acalypha australis;*
Geraniaceae: Geranium *carolinianum, Erodium cicutarium,* Dove's Foot Crane's-bill (Geranium mole), Hedgerow Crabe's-bill (Geranium *pyrenaicum*);
Oxalidaceae: Oxalis corymbose;
Cucurbitaceae: Sicyos *angulatus;*
Poaceae: *Echinochloa crus-galli, Setaria viridis, Setaria faberi, Digitaria sanguinalis, Eleusine indica, Poa annua, Alopecurus myosuroides, Avena fatua, Sorghum halepense, Agropyron repens, Bromus tectorum, Cynodone dactylon, Panicum dichotomiflorum, Panicum texanum, Sorghum vulgare, Alopecurus geniculatus, Lolium multiflorum, Lolium rigidum, Setaria glauca, Beckmannia syzigachne;*
Commelinaceae: *Commelina communis;*
Equisetaceae: *Equisetum arvense;*
Papaveraceae: *Papaver rhoeas;*
Fumarioideae: *Fumaria officinalis;*
Rosaceae: *Alchemilla monticola;*
Primulaceae: *Anagallis arvensis;*
Plantaginaceae: *Plantago major;*
Cyperaceae: *Cyperus iria; Cyperus rotundus; Cyperus esculentus.*

On the other hand, the herbicidal composition of the present invention does not exhibit any phytotoxicity which causes problems for small grain cereals such as *Triticum aestivum, Hordeum vulgare, Secale cereal,* or *Avena sativa.*

Further, an herbicide composition of the present invention can effectively weed out various problematic weeds in nontillage cultivation of small grain cereals, and moreover without causing a significant herbicide injury to the crop.

EXAMPLES

The present invention will be described in more detail by way of Examples, provided that the present invention is not limited to these Examples. In the following Examples, "parts" represents parts by mass.

<Example 1> Wettable Powder Formulation

Six (6) parts of the oxopyrazine derivative represented by the Formula I, 23.5 parts of bromoxynil, 0.5 parts of poly(oxyethylene)octylphenyl ether, 0.5 parts of sodium salt of β-naphthalenesulfonic acid-formaldehyde condensate, 20 parts of diatomaceous earth, and 49.5 parts of clay were mixed and pulverized to obtain a wettable powder formulation.

<Example 2> Water Dispersible Granule Formulation

To 6 parts of the oxopyrazine derivative represented by the Formula I and 23.5 parts of bromoxynil, 5 parts of sodium lignin sulfonate, 1 part of polyoxyethylene alkyl aryl ether, 3 parts of sodium polycarboxylate, 5 parts of white carbon, 1 part of pregelatinized starch, 55.5 parts of calcium carbonate, and 10 parts of water were added, and the mixture was kneaded and granulated by extrusion. The obtained granules were dried in a fluidized bed dryer to yield a water dispersible granule formulation.

<Example 3> Flowable Formulation

To 53.4 parts of water, 6 parts of the oxopyrazine derivative represented by the Formula I, 23.5 parts of bromoxynil, 2 parts of sodium lignin sulfonate, 4 parts of ammonium polyoxyethylene alkyl aryl ether sulfate, 0.5 parts of polyoxyethylene alkyl aryl ether, 0.1 parts of xanthan gum, 0.5 parts of bentonite, and 10 parts of ethylene glycol were added, and the mixture was blended with a high speed stirrer and pulverized with a wet pulverizer to yield a flowable formulation.

<Example 4> Flowable Formulation

To 72.9 parts of water, 10 parts of the oxopyrazine derivative represented by the Formula I, 2 parts of sodium lignin sulfonate, 4 parts of ammonium polyoxyethylene alkyl aryl ether sulfate, 0.5 parts of polyoxyethylene alkyl aryl ether, 0.1 parts of xanthan gum, 0.5 parts of bentonite, and 10 parts of ethylene glycol were added, and the mixture was blended with a high speed stirrer and pulverized with a wet pulverizer to yield a flowable formulation. In this regard, the flowable formulation of the present Example 4 was used as a Comparative Example in a case where the same was not mixed nor combined with the Component B in each of the Test Examples described below.

<Example 5> Granule

To the mixture of 6 parts of the oxopyrazine derivative represented by the above the Formula I, 23.5 parts of bromoxynil, 55.5 parts of an extender obtained by mixing talc and bentonite at a ratio of 1:3, 10 parts of white carbon, and 5 parts of a surfactant mixture of polyoxyethylene sorbitan alkylate, polyoxyethylene alkyl aryl polymer, and alkyl aryl sulfonate, 10 parts of water was added. The mixture was thoroughly kneaded to form a paste, which was extruded through 1 mm diameter sieve holes, dried and then chopped to a length of 0.5 to 1 mm to yield granules.

Next, the effect of an herbicide composition of the present invention will be described by way of Test Examples.

Note that the compound [1] described in the Test Examples represents the compound represented by the above Formula I.

<Test Example 1> Herbicidal Activity Test at Application after Emergence of Weed in Dry-Field Farming A plastic pot with a length, a width, and a depth of equally 11 cm was filled with a soil, in which each of the seeds of *Galium aparine*, *Stellaria media*, and *Lamium amplexicaule* was seeded at a depth of 1 cm from the soil surface. Thereafter, *Galium aparine* was grown to 31 (BBCH scale), *Stellaria media* to 31 (BBCH scale), and *Lamium amplexicaule* to 32 (BBCH scale), to which a flowable formulation prepared according to the Example 3 and diluted with water was sprayed such that the applied dosage of the compound [1] (the compound represented by the Formula I) became 60 g/ha, and the same of bromoxynil became 235 g/ha. Thereafter the cultivation was continued with downside water supply, and the herbicidal activity was rated visually on day 15 after the application. Additionally, as a Comparative Example a flowable formulation containing the compound [1], which was the Component A, was prepared according to the Example 4, and sprayed such that the dosage of the compound [1] became 60 g/ha, and the herbicidal activity was rated in the same manner as in the Test Example 1. Further, as a Comparative Example a flowable formulation containing bromoxynil, which was the Component B, was prepared according to the Example 4, and sprayed such that the dosage of bromoxynil became 235 g/ha, and the herbicidal activity was rated in the same manner as in the Test Example 1. Also in Test Examples 2 to 112, as a Comparative Example, a flowable formulation was prepared with each Component A or each Component B used in each Test Example, sprayed to the application dosage used in each Test Example, and the herbicidal activity was rated.

In the Test Example 1, the herbicidal activity clearly higher than that of the Comparative Example was shown with respect to any of grass species of *Galium aparine*, *Stellaria media*, and *Lamium amplexicaule*.

<Test Example 2> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to Example 3 and glyphosate-ammonium salt were diluted with water and sprayed such that the applied dosage of the compound [1] became 60 g/ha, and the same of the glyphosate-ammonium salt became 1000 g/ha. Thereafter the cultivation was continued with downside water supply, and the herbicidal activity was rated visually on day 15 after the application.

In the Test Example 2, the herbicidal activity clearly higher than that of the Comparative Example was shown with respect to any of grass species of *Galium aparine*, *Stellaria media*, and *Lamium amplexicaule*.

<Test Example 3> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and benfluralin were diluted with water and sprayed such that the applied dosage of the compound [1] became 60 g/ha, and the same of the benfluralin became 1360 g/ha. Thereafter the cultivation was continued with downside water supply, and the herbicidal activity was rated visually on day 15 after the application.

In the Test Example 3, the herbicidal activity clearly higher than that of the Comparative Example was shown with respect to any of grass species of *Galium aparine*, *Stellaria media*, and *Lamium amplexicaule*.

<Test Example 4> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and carfentrazone-ethyl were diluted with water and sprayed such that the applied dosage of the compound [1] became 40 g/h, and the same of the carfentrazone-ethyl became 16 g/ha. Thereafter the cultivation was continued with downside water supply, and the herbicidal activity was rated visually on day 15 after the application.

In the Test Example 4, the herbicidal activity clearly higher than that of the Comparative Example was shown with respect to any of grass species of *Galium aparine*, *Stellaria media*, and *Lamium amplexicaule*.

<Test Example 5> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and carfentrazone-ethyl were diluted with water and sprayed such that the applied dosage of the compound [1] became 60 g/ha, and the same of the carfentrazone-ethyl became 16 g/ha. Thereafter the cultivation was continued with downside water supply, and the herbicidal activity was rated visually on day 15 after the application.

In the Test Example 5, the herbicidal activity clearly higher than that of the Comparative Example was shown with respect to any of grass species of *Galium aparine*, *Stellaria media*, and *Lamium amplexicaule*.

<Test Example 6> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and carfentrazone-ethyl were diluted with water and sprayed such that the applied dosage of the compound [1] became 80 g/ha, and the same of the carfentrazone-ethyl became 16 g/ha. Thereafter the cultivation was continued with downside water supply, and the herbicidal activity was rated visually on day 15 after the application.

In the Test Example 6, the herbicidal activity clearly higher than that of the Comparative Example was shown with respect to any of grass species of *Galium aparine*, *Stellaria media*, and *Lamium amplexicaule*.

<Test Example 7> Herbicidal Activity Test at Application after Emergence of Weed in Dry-Field Farming

*Galium aparine*, *Stellaria media* and *Lamium amplexicaule* were grown in the plastic pots according to Test the Example 1. The flowable formulation prepared according to the Example 3 and chlorpropham were diluted with water and sprayed such that the applied dosage of the compound [1] became 60 g/ha, and the same of the chlorpropham became 100 g/ha. Thereafter the cultivation was continued with downside water supply, and the herbicidal activity was rated visually on day 15 after the application.

In the Test Example 7, the herbicidal activity clearly higher than that of the Comparative Example was shown with respect to any of grass species of *Galium aparine*, *Stellaria media*, and *Lamium amplexicaule*.

<Test Example 8> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and chlorotoluron were diluted with water and sprayed such that the applied dosage of the compound [1] became 60 g/ha, and the same of the chlorotoluron became 2400 g/ha. Thereafter the cultivation was continued with downside water supply, and the herbicidal activity was rated visually on day 15 after the application.

In the Test Example 8, the herbicidal activity clearly higher than that of the Comparative Example was shown with respect to any of grass species of *Galium aparine*, *Stellaria media*, and *Lamium amplexicaule*.

<Test Example 9> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and clethodim were diluted with water and sprayed such that the applied dosage of the compound [1] became 60 g/ha, and the same of the clethodim became 120 g/ha. Thereafter the cultivation was continued with downside water supply, and the herbicidal activity was rated visually on day 15 after the application.

In the Test Example 9, the herbicidal activity clearly higher than that of the Comparative Example was shown with respect to any of grass species of *Galium aparine*, *Stellaria media*, and *Lamium amplexicaule*.

<Test Example 10> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and clopyralid were diluted with water and sprayed such that the applied dosage of the compound [1] became 60 g/ha, and the same of the clopyralid became 100 g/ha. Thereafter the cultivation was continued with downside water supply, and the herbicidal activity was rated visually on day 15 after the application.

In the Test Example 10, the herbicidal activity clearly higher than that of the Comparative Example was shown with respect to any of grass species of *Galium aparine*, *Stellaria media*, and *Lamium amplexicaule*.

<Test Example 11> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and dicamba were diluted with water and sprayed such that the applied dosage of the compound [1] became 40 g/ha, and the same of the dicamba became 120 g/ha. Thereafter the cultivation was continued with downside water supply, and the herbicidal activity was rated visually on day 15 after the application.

In the Test Example 11, the herbicidal activity clearly higher than that of the Comparative Example was shown with respect to any of grass species of *Galium aparine*, *Stellaria media*, and *Lamium amplexicaule*.

<Test Example 12> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and dicamba were diluted with water and sprayed such that the applied dosage of the compound [1] became 60 g/ha, and the same of the dicamba became 120 g/ha. Thereafter the cultivation was continued with downside water supply, and the herbicidal activity was rated visually on day 15 after the application.

In the Test Example 12, the herbicidal activity clearly higher than that of the Comparative Example was shown with respect to any of grass species of *Galium aparine*, *Stellaria media*, and *Lamium amplexicaule*.

<Test Example 13> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and dicamba were diluted with water and sprayed such that the applied dosage of the compound [1] became 80 g/ha, and the same of the dicamba became 120 g/ha. Thereafter the cultivation was continued with downside water supply, and the herbicidal activity was rated visually on day 15 after the application.

In the Test Example 13, the herbicidal activity clearly higher than that of the Comparative Example was shown with respect to any of grass species of *Galium aparine*, *Stellaria media*, and *Lamium amplexicaule*.

<Test Example 14> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and diflufenican were diluted with water and sprayed such that the applied dosage of the compound [1] became 60 g/ha, and the same of the diflufenican became 100 g/ha. Thereafter the cultivation was continued with downside water supply, and the herbicidal activity was rated visually on day 15 after the application.

In the Test Example 14, the herbicidal activity clearly higher than that of the Comparative Example was shown with respect to any of grass species of *Galium aparine*, *Stellaria media*, and *Lamium amplexicaule*.

<Test Example 15> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and florasulam were diluted with water and sprayed such that the applied dosage of the compound [1] became 40 g/ha, and the same of the florasulam became 3 g/ha. Thereafter the cultivation was continued with downside water supply, and the herbicidal activity was rated visually on day 15 after the application.

In the Test Example 15, the herbicidal activity clearly higher than that of the Comparative Example was shown with respect to any of grass species of *Galium aparine*, *Stellaria media*, and *Lamium amplexicaule*.

<Test Example 16> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and florasulam were diluted with water and sprayed such that the applied dosage of the compound [1] became 60 g/ha, and the same of the florasulam became 3 g/ha. Thereafter the cultivation was continued with downside water supply, and the herbicidal activity was rated visually on day 15 after the application.

In the Test Example 16, the herbicidal activity clearly higher than that of the Comparative Example was shown with respect to any of grass species of *Galium aparine*, *Stellaria media*, and *Lamium amplexicaule*.

<Test Example 17> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and florasulam were diluted with water and sprayed such that the applied dosage of the compound [1] became 80 g/ha, and the same of the florasulam became 3 g/ha. Thereafter the cultivation was continued with downside water supply, and the herbicidal activity was rated visually on day 15 after the application.

In the Test Example 17, the herbicidal activity clearly higher than that of the Comparative Example was shown with respect to any of grass species of *Galium aparine*, *Stellaria media*, and *Lamium amplexicaule*.

<Test Example 18> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and flufenacet were diluted with water and sprayed such that the applied dosage of the compound [1] became 60 g/ha, and the same of the flufenacet became 300 g/ha. Thereafter the cultivation was continued with downside water supply, and the herbicidal activity was rated visually on day 15 after the application.

In the Test Example 18, the herbicidal activity clearly higher than that of the Comparative Example was shown with respect to any of grass species of *Galium aparine*, *Stellaria media*, and *Lamium amplexicaule*.

<Test Example 19> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and flumioxazin were diluted with water and sprayed such that the applied dosage of the compound [1] became 60 g/ha, and the same of the flumioxazin became 50 g/ha. Thereafter the cultivation was continued with downside water supply, and the herbicidal activity was rated visually on day 15 after the application.

In the Test Example 19, the herbicidal activity clearly higher than that of the Comparative Example was shown with respect to any of grass species of *Galium aparine*, *Stellaria media*, and *Lamium amplexicaule*.

<Test Example 20> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and fluroxypyr-meptyl were diluted with water and sprayed such that the applied dosage of the compound [1] became 36 g/ha, and the same of the fluroxypyr-meptyl became 100 g/ha. Thereafter the cultivation was continued with downside water supply, and the herbicidal activity was rated visually on day 15 after the application.

In the Test Example 20, the herbicidal activity clearly higher than that of the Comparative Example was shown with respect to any of grass species of *Galium aparine*, *Stellaria media*, and *Lamium amplexicaule*.

<Test Example 21> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and fluroxypyr-meptyl were diluted with water and sprayed such that the applied dosage of the compound [1] became 60 g/ha, and the same of the fluroxypyr-meptyl became 100 g/ha. Thereafter the cultivation was continued with downside water supply, and the herbicidal activity was rated visually on day 15 after the application.

In the Test Example 21, the herbicidal activity clearly higher than that of the Comparative Example was shown with respect to any of grass species of *Galium aparine*, *Stellaria media*, and *Lamium amplexicaule*.

<Test Example 22> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and fluroxypyr-meptyl were diluted with water and sprayed such that the applied dosage of the compound [1] became 80 g/ha, and the same of the fluroxypyr-meptyl became 100 g/ha. Thereafter the cultivation was continued with downside water supply, and the herbicidal activity was rated visually on day 15 after the application.

In the Test Example 22, the herbicidal activity clearly higher than that of the Comparative Example was shown with respect to any of grass species of *Galium aparine*, *Stellaria media*, and *Lamium amplexicaule*.

<Test Example 23> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and flupyrsulfuron-methyl were diluted with water and sprayed such that the applied dosage of the compound [1] became 60 g/ha, and the same of the flupyrsulfuron-methyl became 10 g/ha. Thereafter the cultivation was continued with downside water supply, and the herbicidal activity was rated visually on day 15 after the application.

In the Test Example 23, the herbicidal activity clearly higher than that of the Comparative Example was shown with respect to any of grass species of *Galium aparine*, *Stellaria media*, and *Lamium amplexicaule*.

<Test Example 24> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and isodecyl alcohol ethoxylate were diluted with water and sprayed such that the applied dosage of the compound [1] became 60 g/ha, and the same of the isodecyl alcohol ethoxylate became 90 g/ha. Thereafter the cultivation was continued with downside water supply, and the herbicidal activity was rated visually on day 15 after the application. In the Test Example 24, the herbicidal activity clearly higher than that of the Comparative Example was shown with respect to any of grass species of *Galium aparine*, *Stellaria media*, and *Lamium amplexicaule*.

<Test Example 25> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and imazosulfuron were diluted with water and sprayed such that the applied dosage of the compound [1] became 60 g/ha, and the same of the imazosulfuron became 50 g/ha. Thereafter the cultivation was continued with downside water supply, and the herbicidal activity was rated visually on day 15 after the application.

In the Test Example 25, the herbicidal activity clearly higher than that of the Comparative Example was shown with respect to any of grass species of *Galium aparine*, *Stellaria media*, and *Lamium amplexicaule*.

<Test Example 26> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and isoproturon were diluted with water and sprayed such that the applied dosage of the compound [1] became 60 g/ha, and the same of the isoproturon became 7.5 g/ha. Thereafter the cultivation was continued with downside water supply, and the herbicidal activity was rated visually on day 15 after the application.

In the Test Example 26, the herbicidal activity clearly higher than that of the Comparative Example was shown with respect to any of grass species of *Galium aparine*, *Stellaria media*, and *Lamium amplexicaule*.

<Test Example 27> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and isoxaben were diluted with water and sprayed such that the applied dosage of the compound [1] became 60 g/ha, and the same of the isoxaben became 125 g/ha. Thereafter the cultivation was continued with downside water supply, and the herbicidal activity was rated visually on day 15 after the application.

In the Test Example 27, the herbicidal activity clearly higher than that of the Comparative Example was shown with respect to any of grass species of *Galium aparine*, *Stellaria media*, and *Lamium amplexicaule*.

<Test Example 28> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and isoxaflutole were diluted with water and sprayed such that the applied dosage of the compound [1] became 60 g/ha, and the same of the isoxaflutole became 100 g/ha. Thereafter the cultivation was continued with downside water supply, and the herbicidal activity was rated visually on day 15 after the application.

In the Test Example 28, the herbicidal activity clearly higher than that of the Comparative Example was shown with respect to any of grass species of *Galium aparine*, *Stellaria media*, and *Lamium amplexicaule*.

<Test Example 29> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and iodosulfuron were diluted with water and sprayed such that the applied dosage of the compound [1] became 60 g/ha, and the same of the iodosulfuron became 15 g/ha. Thereafter the cultivation was continued with downside water supply, and the herbicidal activity was rated visually on day 15 after the application.

In the Test Example 29, the herbicidal activity clearly higher than that of the Comparative Example was shown with respect to any of grass species of *Galium aparine*, *Stellaria media*, and *Lamium amplexicaule*.

<Test Example 30> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and Roundup® potassium salt (ingredient: potassium salt of glyphosate) were diluted with water and sprayed such that the applied dosage of the compound [1] became 60 g/ha, and the same of the Roundup® potassium salt became 1000 g/ha. Thereafter the cultivation was continued with downside water supply, and the herbicidal activity was rated visually on day 15 after the application.

In the Test Example 30, the herbicidal activity clearly higher than that of the Comparative Example was shown with respect to any of grass species of *Galium aparine*, *Stellaria media*, and *Lamium amplexicaule*.

<Test Example 31> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and maleic hydrazide were diluted with water and sprayed such that the applied dosage of the compound [1] became 60 g/ha, and the same of the maleic hydrazide became 5000 g/ha. Thereafter the cultivation was continued with downside water supply, and the herbicidal activity was rated visually on day 15 after the application.

In the Test Example 31, the herbicidal activity clearly higher than that of the Comparative Example was shown with respect to any of grass species of *Galium aparine*, *Stellaria media*, and *Lamium amplexicaule*.

<Test Example 32> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and MCPA were diluted with water and sprayed such that the applied dosage of the compound [1] became 60 g/ha, and the same of the MCPA became 500 g/ha. Thereafter the cultivation was continued with downside water supply, and the herbicidal activity was rated visually on day 15 after the application.

In the Test Example 32, the herbicidal activity clearly higher than that of the Comparative Example was shown with respect to any of grass species of *Galium aparine*, *Stellaria media*, and *Lamium amplexicaule*.

<Test Example 33> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and mecoprop-P potassium salt were diluted with water and sprayed such that the applied dosage of the compound [1] became 40 g/ha, and the same of the mecoprop-P potassium salt became 600 g/ha. Thereafter the cultivation was continued with downside water supply, and the herbicidal activity was rated visually on day 15 after the application.

In the Test Example 33, the herbicidal activity clearly higher than that of the Comparative Example was shown with respect to any of grass species of *Galium aparine*, *Stellaria media*, and *Lamium amplexicaule*.

<Test Example 34> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and mecoprop-P-potassium salt were diluted with water and sprayed such that the applied dosage of the compound [1] became 60 g/ha, and the same of the mecoprop-P potassium salt became 600 g/ha. Thereafter the cultivation was continued with downside water supply, and the herbicidal activity was rated visually on day 15 after the application.

In the Test Example 34, the herbicidal activity clearly higher than that of the Comparative Example was shown with respect to any of grass species of *Galium aparine*, *Stellaria media*, and *Lamium amplexicaule*.

<Test Example 35> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and mecoprop-P-potassium salt were diluted with water and sprayed such that the applied dosage of the compound [1] became 80 g/ha, and the same of the mecoprop-P-potassium salt became 600 g/ha. Thereafter the cultivation was continued with downside water supply, and the herbicidal activity was rated visually on day 15 after the application.

In the Test Example 35, the herbicidal activity clearly higher than that of the Comparative Example was shown with respect to any of grass species of *Galium aparine*, *Stellaria media*, and *Lamium amplexicaule*.

<Test Example 36> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and mesosulfuron-methyl were diluted with water and sprayed such that the applied dosage of the compound [1] became 60 g/ha, and the same of the mesosulfuron-methyl became 10 g/ha. Thereafter the cultivation was continued with downside water supply, and the herbicidal activity was rated visually on day 15 after the application.

In the Test Example 36, the herbicidal activity clearly higher than that of the Comparative Example was shown with respect to any of grass species of *Galium aparine*, *Stellaria media*, and *Lamium amplexicaule*.

<Test Example 37> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and metsulfuron-methyl were diluted with water and sprayed such that the applied dosage of the compound [1] became 40 g/ha, and the same of the metsulfuron-methyl became 5 g/ha. Thereafter the cultivation was continued with downside water supply, and the herbicidal activity was rated visually on day 15 after the application.

In the Test Example 37, the herbicidal activity clearly higher than that of the Comparative Example was shown with respect to any of grass species of *Galium aparine*, *Stellaria media*, and *Lamium amplexicaule*.

<Test Example 38> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and metsulfuron-methyl were diluted with water and sprayed such that the applied dosage of the compound [1] became 60 g/ha, and the same of the metsulfuron-methyl became 5 g/ha. Thereafter the cultivation was continued with downside water supply, and the herbicidal activity was rated visually on day 15 after the application.

In the Test Example 38, the herbicidal activity clearly higher than that of the Comparative Example was shown with respect to any of grass species of *Galium aparine*, *Stellaria media*, and *Lamium amplexicaule*.

<Test Example 39> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and metsulfuron-methyl were diluted with water and sprayed such that the applied dosage of the compound [1] became 80 g/ha, and the same of the metsulfuron-methyl became 5 g/ha. Thereafter the cultivation was continued with downside water supply, and the herbicidal activity was rated visually on day 15 after the application.

In the Test Example 39, the herbicidal activity clearly higher than that of the Comparative Example was shown with respect to any of grass species of *Galium aparine*, *Stellaria media*, and *Lamium amplexicaule*.

<Test Example 40> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and metsulfuron-methyl were diluted with water and sprayed such that the applied dosage of the compound [1] became 40 g/ha, and the same of the metsulfuron-methyl became 15 g/ha. Thereafter the cultivation was continued with downside water supply, and the herbicidal activity was rated visually on day 15 after the application.

In the Test Example 40, the herbicidal activity clearly higher than that of the Comparative Example was shown with respect to any of grass species of *Galium aparine*, *Stellaria media*, and *Lamium amplexicaule*.

<Test Example 41> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and metsulfuron-methyl were diluted with water and sprayed such that the applied dosage of the compound [1] became 60 g/ha, and the same of the metsulfuron-methyl became 15 g/ha. Thereafter the cultivation was continued with downside water supply, and the herbicidal activity was rated visually on day 15 after the application.

In the Test Example 41, the herbicidal activity clearly higher than that of the Comparative Example was shown with respect to any of grass species of *Galium aparine*, *Stellaria media*, and *Lamium amplexicaule*.

<Test Example 42> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and metsulfuron-methyl were diluted with water and sprayed such that the applied dosage of the compound [1] became 80 g/ha, and the same of the metsulfuron-methyl became 15 g/ha. Thereafter the cultivation was continued with downside water supply, and the herbicidal activity was rated visually on day 15 after the application.

In the Test Example 42, the herbicidal activity clearly higher than that of the Comparative Example was shown with respect to any of grass species of *Galium aparine*, *Stellaria media*, and *Lamium amplexicaule*.

<Test Example 43> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and metsulfuron-methyl were diluted with water and sprayed such that the applied dosage of the compound [1] became 40 g/ha, and the same of the metsulfuron-methyl became 25 g/ha. Thereafter the cultivation was continued with downside water supply, and the herbicidal activity was rated visually on day 15 after the application.

In the Test Example 43, the herbicidal activity clearly higher than that of the Comparative Example was shown with respect to any of grass species of *Galium aparine*, *Stellaria media*, and *Lamium amplexicaule*.

<Test Example 44> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and metsulfuron-methyl were diluted with water and sprayed such that the applied dosage of the compound [1] became 60 g/ha, and the same of the metsulfuron-methyl became 25 g/ha. Thereafter the cultivation was continued with downside water supply, and the herbicidal activity was rated visually on day 15 after the application.

In the Test Example 44, the herbicidal activity clearly higher than that of the Comparative Example was shown with respect to any of grass species of *Galium aparine*, *Stellaria media*, and *Lamium amplexicaule*.

<Test Example 45> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and metsulfuron-methyl were diluted with water and sprayed such that the applied dosage of the compound [1] became 80 g/ha, and the same of the metsulfuron-methyl became 25 g/ha. Thereafter the cultivation was continued with downside water supply, and the herbicidal activity was rated visually on day 15 after the application.

In the Test Example 45, the herbicidal activity clearly higher than that of the Comparative Example was shown with respect to any of grass species of *Galium aparine*, *Stellaria media*, and *Lamium amplexicaule*.

<Test Example 46> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and nicosulfuron were diluted with water and sprayed such that the applied dosage of the compound [1] became 60 g/ha, and the same of the nicosulfuron became 40 g/ha. Thereafter the cultivation was continued with downside water supply, and the herbicidal activity was rated visually on day 15 after the application.

In the Test Example 46, the herbicidal activity clearly higher than that of the Comparative Example was shown with respect to any of grass species of *Galium aparine*, *Stellaria media*, and *Lamium amplexicaule*.

<Test Example 47> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and pelargonic acid were diluted with water and sprayed such that the applied dosage of the compound [1] became 60 g/ha, and the same of the pelargonic acid became 10.6 g/ha. Thereafter the cultivation was continued with downside water supply, and the herbicidal activity was rated visually on day 15 after the application.

In the Test Example 47, the herbicidal activity clearly higher than that of the Comparative Example was shown with respect to any of grass species of *Galium aparine*, *Stellaria media*, and *Lamium amplexicaule*.

<Test Example 48> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and pendimethalin were diluted with water and sprayed such that the applied dosage of the compound [1] became 60 g/ha, and the same of the pendimethalin became 600 g/ha. Thereafter the cultivation was continued with downside water supply, and the herbicidal activity was rated visually on day 15 after the application.

In the Test Example 48, the herbicidal activity clearly higher than that of the Comparative Example was shown with respect to any of grass species of *Galium aparine*, *Stellaria media*, and *Lamium amplexicaule*.

<Test Example 49> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and pinoxaden were diluted with water and sprayed such that the applied dosage of the compound [1] became 60 g/ha, and the same of the pinoxaden became 60 g/ha. Thereafter the cultivation was continued with downside water supply, and the herbicidal activity was rated visually on day 15 after the application.

In the Test Example 49, the herbicidal activity clearly higher than that of the Comparative Example was shown with respect to any of grass species of *Galium aparine*, *Stellaria media*, and *Lamium amplexicaule*.

<Test Example 50> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and propyzamide were diluted with water and sprayed such that the applied dosage of the compound [1] became 60 g/ha, and the same of the propyzamide became 1500 g/ha. Thereafter the cultivation was continued with downside water supply, and the herbicidal activity was rated visually on day 15 after the application.

In the Test Example 50, the herbicidal activity clearly higher than that of the Comparative Example was shown with respect to any of grass species of *Galium aparine*, *Stellaria media*, and *Lamium amplexicaule*.

<Test Example 51> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and prosulfocarb were diluted with water and sprayed such that the applied dosage of the compound [1] became 60 g/ha, and the same of the prosulfocarb became 2400 g/ha. Thereafter the cultivation was continued with downside water supply, and the herbicidal activity was rated visually on day 15 after the application.

In the Test Example 51, the herbicidal activity clearly higher than that of the Comparative Example was shown with respect to any of grass species of *Galium aparine*, *Stellaria media*, and *Lamium amplexicaule*.

<Test Example 52> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and pyraflufen-ethyl were diluted with water and sprayed such that the applied dosage of the compound [1] became 60 g/ha, and the same of the pyraflufen-ethyl became 10.8 g/ha. Thereafter the cultivation was continued with downside water supply, and the herbicidal activity was rated visually on day 15 after the application.

In the Test Example 52, the herbicidal activity clearly higher than that of the Comparative Example was shown with respect to any of grass species of *Galium aparine*, *Stellaria media*, and *Lamium amplexicaule*.

<Test Example 53> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and pyroxsulam were diluted with water and sprayed such that the applied dosage of the compound [1] became 60 g/ha, and the same of the pyroxsulam became 18.8 g/ha. Thereafter the cultivation was continued with downside water supply, and the herbicidal activity was rated visually on day 15 after the application.

In the Test Example 53, the herbicidal activity clearly higher than that of the Comparative Example was shown with respect to any of grass species of *Galium aparine*, *Stellaria media*, and *Lamium amplexicaule*.

<Test Example 54> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and quinoclamine were diluted with water and sprayed such that the applied dosage of the compound [1] became 60 g/ha, and the same of the quinoclamine became 3750 g/ha. Thereafter the cultivation was continued with downside water supply, and the herbicidal activity was rated visually on day 15 after the application.

In the Test Example 54, the herbicidal activity clearly higher than that of the Comparative Example was shown with respect to any of grass species of *Galium aparine*, *Stellaria media*, and *Lamium amplexicaule*.

<Test Example 55> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and quizalofop-P-tefuryl were diluted with water and sprayed such that the applied dosage of the compound [1] became 60 g/ha, and the same of the quizalofop-P-tefuryl became 100 g/ha. Thereafter the cultivation was continued with downside water supply, and the herbicidal activity was rated visually on day 15 after the application.

In the Test Example 55, the herbicidal activity clearly higher than that of the Comparative Example was shown with respect to any of grass species of *Galium aparine*, *Stellaria media*, and *Lamium amplexicaule*.

<Test Example 56> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and sulfosulfuron were diluted with water and sprayed such that the applied dosage of the compound [1] became 60 g/ha, and the same of the sulfosulfuron became 20 g/ha. Thereafter the cultivation was continued with downside water supply, and the herbicidal activity was rated visually on day 15 after the application.

In the Test Example 56, the herbicidal activity clearly higher than that of the Comparative Example was shown with respect to any of grass species of *Galium aparine*, *Stellaria media*, and *Lamium amplexicaule*.

<Test Example 57> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and thifensulfuron-methyl were diluted with water and sprayed such that the applied dosage of the compound [1] became 60 g/ha, and the same of the thifensulfuron-methyl became 40 g/ha. Thereafter the cultivation was continued with downside water supply, and the herbicidal activity was rated visually on day 15 after the application.

In the Test Example 57, the herbicidal activity clearly higher than that of the Comparative Example was shown with respect to any of grass species of *Galium aparine*, *Stellaria media*, and *Lamium amplexicaule*.

<Test Example 58> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and tribenuron-methyl were diluted with water and sprayed such that the applied dosage of the compound [1] became 60 g/ha, and the same of the tribenuron-methyl became 6 g/ha. Thereafter the cultivation was continued with downside water supply, and the herbicidal activity was rated visually on day 15 after the application.

In the Test Example 58, the herbicidal activity clearly higher than that of the Comparative Example was shown with respect to any of grass species of *Galium aparine*, *Stellaria media*, and *Lamium amplexicaule*.

<Test Example 59> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and ioxynil were diluted with water and sprayed such that the applied dosage of the compound [1] became 60 g/ha, and the same of the ioxynil became 300 g/ha. Thereafter the cultivation was continued with downside water supply, and the herbicidal activity was rated visually on day 15 after the application.

In the Test Example 59, the herbicidal activity clearly higher than that of the Comparative Example was shown with respect to any of grass species of *Galium aparine*, *Stellaria media*, and *Lamium amplexicaule*.

<Test Example 60> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and bicyclopyrone were diluted with water and sprayed such that the applied dosage of the compound [1] became 60 g/ha, and the same of the bicyclopyrone became 50 g/ha. Thereafter the cultivation was continued with downside water supply, and the herbicidal activity was rated visually on day 15 after the application.

In the Test Example 60, the herbicidal activity clearly higher than that of the Comparative Example was shown with respect to any of grass species of *Galium aparine*, *Stellaria media*, and *Lamium amplexicaule*.

<Test Example 61> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and halauxifen-methyl were diluted with water and sprayed such that the applied dosage of the compound [1] became 60 g/ha, and the same of the halauxifen-methyl became 10 g/ha. Thereafter the cultivation was continued with downside water supply, and the herbicidal activity was rated visually on day 15 after the application.

In the Test Example 61, the herbicidal activity clearly higher than that of the Comparative Example was shown with respect to any of grass species of *Galium aparine*, *Stellaria media*, and *Lamium amplexicaule*.

<Test Example 62> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, diflufenican and flufenacet (trade name: Liberator 500 SC) were diluted with water and sprayed such that the applied dosage of the compound [1] became 40 g/ha, the same of the diflufenican became 30 g/ha, and the same of the flufenacet became 120 g/ha. Thereafter the cultivation was continued with downside water supply, and the herbicidal activity was rated visually on day 15 after the application.

In the Test Example 62, the herbicidal activity clearly higher than that of the Comparative Example was shown with respect to any of grass species of *Galium aparine*, *Stellaria media*, and *Lamium amplexicaule*.

<Test Example 63> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, diflufenican and flufenacet (trade name: Liberator 500 SC) were diluted with water and sprayed such that the applied dosage of the compound [1] became 60 g/ha, the same of the diflufenican became 30 g/ha, and the same of the flufenacet became 120 g/ha. Thereafter the cultivation was continued with downside water supply, and the herbicidal activity was rated visually on day 15 after the application.

In the Test Example 63, the herbicidal activity clearly higher than that of the Comparative Example was shown with respect to any of grass species of *Galium aparine*, *Stellaria media*, and *Lamium amplexicaule*.

<Test Example 64> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, diflufenican and flufenacet (trade name: Liberator 500 SC) were diluted with water and sprayed such that the applied dosage of the compound [1] became 80 g/ha, the same of the diflufenican became 30 g/ha, and the same of the flufenacet became 120 g/ha. Thereafter the cultivation was continued with downside water supply, and the herbicidal activity was rated visually on day 15 after the application.

In the Test Example 64, the herbicidal activity clearly higher than that of the Comparative Example was shown with respect to any of grass species of *Galium aparine*, *Stellaria media*, and *Lamium amplexicaule*.

<Test Example 65> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, iodosulfuron and mesosulfuron (trade name: Atlantis WG) were diluted with water and sprayed such that the applied dosage of the compound [1] became 60 g/ha, the same of the iodosulfuron became 2.4 g/ha, and the same of the mesosulfuron became 12 g/ha. Thereafter the cultivation was continued with downside water supply, and the herbicidal activity was rated visually on day 15 after the application.

In the Test Example 65, the herbicidal activity clearly higher than that of the Comparative Example was shown with respect to any of grass species of *Galium aparine*, *Stellaria media*, and *Lamium amplexicaule*.

<Test Example 66> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, flufenacet and pendimethalin (trade name: Crystal) were diluted with water and sprayed such that the applied dosage of the compound [1] became 40 g/ha, the same of the flufenacet became 240 g/ha, and the same of the pendimethalin became 1200 g/ha. Thereafter the cultivation was continued with downside water supply, and the herbicidal activity was rated visually on day 15 after the application.

In the Test Example 66, the herbicidal activity clearly higher than that of the Comparative Example was shown with respect to any of grass species of *Galium aparine*, *Stellaria media*, and *Lamium amplexicaule*.

<Test Example 67> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, flufenacet and pendimethalin (trade name: Crystal) were diluted with water and sprayed such that the applied dosage of the compound [1] became 60 g/ha, the same of the flufenacet became 240 g/ha, and the same of the pendimethalin became 1200 g/ha. Thereafter the cultivation was continued with downside water supply, and the herbicidal activity was rated visually on day 15 after the application.

In the Test Example 67, the herbicidal activity clearly higher than that of the Comparative Example was shown with respect to any of grass species of *Galium aparine*, *Stellaria media*, and *Lamium amplexicaule*.

<Test Example 68> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, flufenacet and pendimethalin (trade name: Crystal) were diluted with water and sprayed such that the applied dosage of the compound [1] became 80 g/ha, the same of the flufenacet became 240 g/ha, and the same of the pendimethalin became 1200 g/ha. Thereafter the cultivation was continued with downside water supply, and the herbicidal activity was rated visually on day 15 after the application.

In the Test Example 68, the herbicidal activity clearly higher than that of the Comparative Example was shown with respect to any of grass species of *Galium aparine*, *Stellaria media*, and *Lamium amplexicaule*.

<Test Example 69> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, florasulam and pyroxsulam (trade name: Broadway Star) were diluted with water and sprayed such that the applied dosage of the compound [1] became 40 g/ha, the same of the florasulam became 3.75 g/ha, and the same of the pyroxsulam became 18.8 g/ha. Thereafter the cultivation was continued with downside water supply, and the herbicidal activity was rated visually on day 15 after the application.

In the Test Example 69, the herbicidal activity clearly higher than that of the Comparative Example was shown with respect to any of grass species of *Galium aparine*, *Stellaria media*, and *Lamium amplexicaule*.

<Test Example 70> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, florasulam and pyroxsulam (trade name: Broadway Star) were diluted with water and sprayed such that the applied dosage of the compound [1] became 60 g/ha, the same of the florasulam became 3.75 g/ha, and the same of the pyroxsulam became 18.8 g/ha. Thereafter the cultivation was continued with downside water supply, and the herbicidal activity was rated visually on day 15 after the application.

In the Test Example 70, the herbicidal activity clearly higher than that of the Comparative Example was shown with respect to any of grass species of *Galium aparine*, *Stellaria media*, and *Lamium amplexicaule*.

<Test Example 71> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, florasulam and pyroxsulam (trade name: Broadway Star) were diluted with water and sprayed such that the applied dosage of the compound [1] became 80 g/ha, the same of the florasulam became 3.75 g/ha, and the same of the pyroxsulam became 18.8 g/ha. Thereafter the cultivation was continued with downside water supply, and the herbicidal activity was rated visually on day 15 after the application.

In the Test Example 71, the herbicidal activity clearly higher than that of the Comparative Example was shown with respect to any of grass species of *Galium aparine*, *Stellaria media*, and *Lamium amplexicaule*.

<Test Example 72> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, florasulam and fluroxypyr-meptyl (trade name: Spitfire) were diluted with water and sprayed such that the applied dosage of the compound [1] became 40 g/ha, the same of the florasulam became 5 g/ha, and the same of the fluroxypyr-meptyl became 100 g/ha. Thereafter the cultivation was continued with downside water supply, and the herbicidal activity was rated visually on day 15 after the application.

In the Test Example 72, the herbicidal activity clearly higher than that of the Comparative Example was shown with respect to any of grass species of *Galium aparine*, *Stellaria media*, and *Lamium amplexicaule*.

<Test Example 73> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, florasulam and fluroxypyr-meptyl (trade name: Spitfire) were diluted with water and sprayed such that the applied dosage of the compound [1] became 60 g/ha, the same of the florasulam became 5 g/ha, and the same of the fluroxypyr-meptyl became 100 g/ha. Thereafter the cultivation was continued with downside water supply, and the herbicidal activity was rated visually on day 15 after the application.

In the Test Example 73, the herbicidal activity clearly higher than that of the Comparative Example was shown with respect to any of grass species of *Galium aparine*, *Stellaria media*, and *Lamium amplexicaule*.

<Test Example 74> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, florasulam and fluroxypyr-meptyl (trade name: Spitfire) were diluted with water and sprayed such that the applied dosage of the compound [1] became 80 g/ha, the same of the florasulam became 5 g/ha, and the same of the fluroxypyr-meptyl became 100 g/ha. Thereafter the cultivation was continued with downside water supply, and the herbicidal activity was rated visually on day 15 after the application.

In the Test Example 74, the herbicidal activity clearly higher than that of the Comparative Example was shown with respect to any of grass species of *Galium aparine*, *Stellaria media*, and *Lamium amplexicaule*.

<Test Example 75> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, clopyralid and florasulam (trade name: Primus Perfect) were diluted with water and sprayed such that the applied dosage of the compound [1] became 40 g/ha, the same of the clopyralid became 45 g/ha, and the same of the florasulam became 3.75 g/ha. Thereafter the cultivation was continued with downside water supply, and the herbicidal activity was rated visually on day 15 after the application.

In the Test Example 75, the herbicidal activity clearly higher than that of the Comparative Example was shown with respect to any of grass species of *Galium aparine*, *Stellaria media*, and *Lamium amplexicaule*.

<Test Example 76> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, clopyralid and florasulam (trade name: Primus Perfect) were diluted with water and sprayed such that the applied dosage of the compound [1] became 60 g/ha, the same of the clopyralid became 45 g/ha, and the same of the florasulam became 3.75 g/ha. Thereafter the cultivation was continued with downside water supply, and the herbicidal activity was rated visually on day 15 after the application.

In the Test Example 76, the herbicidal activity clearly higher than that of the Comparative Example was shown with respect to any of grass species of *Galium aparine, Stellaria media*, and *Lamium amplexicaule.*

<Test Example 77> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, clopyralid and florasulam (trade name: Primus Perfect) were diluted with water and sprayed such that the applied dosage of the compound [1] became 80 g/ha, the same of the clopyralid became 45 g/ha, and the same of the florasulam became 3.75 g/ha. Thereafter the cultivation was continued with downside water supply, and the herbicidal activity was rated visually on day 15 after the application.

In the Test Example 77, the herbicidal activity clearly higher than that of the Comparative Example was shown with respect to any of grass species of *Galium aparine, Stellaria media*, and *Lamium amplexicaule.*

<Test Example 78> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, clopyralid and fluroxypyr-meptyl were diluted with water and sprayed such that the applied dosage of the compound [1] became 40 g/ha, the same of the clopyralid became 45 g/ha, and the same of the fluroxypyr-meptyl became 100 g/ha. Thereafter the cultivation was continued with downside water supply, and the herbicidal activity was rated visually on day 15 after the application.

In the Test Example 78, the herbicidal activity clearly higher than that of the Comparative Example was shown with respect to any of grass species of *Galium aparine, Stellaria media*, and *Lamium amplexicaule.*

<Test Example 79> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, clopyralid and fluroxypyr-meptyl were diluted with water and sprayed such that the applied dosage of the compound [1] became 60 g/ha, the same of the clopyralid became 45 g/ha, and the same of the fluroxypyr-meptyl became 100 g/ha. Thereafter the cultivation was continued with downside water supply, and the herbicidal activity was rated visually on day 15 after the application.

In the Test Example 79, the herbicidal activity clearly higher than that of the Comparative Example was shown with respect to any of grass species of *Galium aparine, Stellaria media*, and *Lamium amplexicaule.*

<Test Example 80> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, clopyralid and fluroxypyr-meptyl were diluted with water and sprayed such that the applied dosage of the compound [1] became 80 g/ha, the same of the clopyralid became 45 g/ha, and the same of the fluroxypyr-meptyl became 100 g/ha. Thereafter the cultivation was continued with downside water supply, and the herbicidal activity was rated visually on day 15 after the application.

In the Test Example 80, the herbicidal activity clearly higher than that of the Comparative Example was shown with respect to any of grass species of *Galium aparine, Stellaria media*, and *Lamium amplexicaule.*

<Test Example 81> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, diflufenican and mecoprop-P-potassium (trade name: Pixie) were diluted with water and sprayed such that the applied dosage of the compound [1] became 40 g/ha, the same of the diflufenican became 33 g/ha, and the same of the mecoprop-P-potassium became 500 g/ha. Thereafter the cultivation was continued with downside water supply, and the herbicidal activity was rated visually on day 15 after the application.

In the Test Example 81, the herbicidal activity clearly higher than that of the Comparative Example was shown with respect to any of grass species of *Galium aparine, Stellaria media*, and *Lamium amplexicaule.*

<Test Example 82> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, diflufenican and mecoprop-P-potassium (trade name: Pixie) were diluted with water and sprayed such that the applied dosage of the compound [1] became 60 g/ha, the same of the diflufenican became 33 g/ha, and the same of the mecoprop-P-potassium became 500 g/ha. Thereafter the cultivation was continued with downside water supply, and the herbicidal activity was rated visually on day 15 after the application.

In the Test Example 82, the herbicidal activity clearly higher than that of the Comparative Example was shown with respect to any of grass species of *Galium aparine, Stellaria media*, and *Lamium amplexicaule.*

<Test Example 83> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, diflufenican and mecoprop-P-potassium (trade name: Pixie) were diluted with water and sprayed such that the applied dosage of the compound [1] became 80 g/ha, the same of the diflufenican became 33 g/ha, and the same of the mecoprop-P-potassium became 500 g/ha. Thereafter the cultivation was continued with downside water supply, and the herbicidal activity was rated visually on day 15 after the application.

In the Test Example 83, the herbicidal activity clearly higher than that of the Comparative Example was shown with respect to any of grass species of *Galium aparine, Stellaria media*, and *Lamium amplexicaule*.

<Test Example 84> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, and metsulfuron-methyl and tribenuron-methyl (trade name: Ally Max) were diluted with water and sprayed such that the applied dosage of the compound [1] became 40 g/ha, the same of the metsulfuron-methyl became 6 g/ha, and the same of the tribenuron-methyl became 6 g/ha. Thereafter the cultivation was continued with downside water supply, and the herbicidal activity was rated visually on day 15 after the application.

In the Test Example 84, the herbicidal activity clearly higher than that of the Comparative Example was shown with respect to any of grass species of *Galium aparine, Stellaria media*, and *Lamium amplexicaule*.

<Test Example 85> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, metsulfuron-methyl and tribenuron-methyl (trade name: Ally Max) were diluted with water and sprayed such that the applied dosage of the compound [1] became 60 g/ha, the same of the metsulfuron-methyl became 6 g/ha, and the same of the tribenuron-methyl became 6 g/ha. Thereafter the cultivation was continued with downside water supply, and the herbicidal activity was rated visually on day 15 after the application.

In the Test Example 85, the herbicidal activity clearly higher than that of the Comparative Example was shown with respect to any of grass species of *Galium aparine, Stellaria media*, and *Lamium amplexicaule*.

<Test Example 86> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, metsulfuron-methyl and tribenuron-methyl (trade name: Ally Max) were diluted with water and sprayed such that the applied dosage of the compound [1] became 80 g/ha, the same of the metsulfuron-methyl became 6 g/ha, and the same of the tribenuron-methyl became 6 g/ha. Thereafter the cultivation was continued with downside water supply, and the herbicidal activity was rated visually on day 15 after the application.

In the Test Example 86, the herbicidal activity clearly higher than that of the Comparative Example was shown with respect to any of grass species of *Galium aparine, Stellaria media*, and *Lamium amplexicaule*.

<Test Example 87> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, florasulam and tritosulfuron (trade name: Biathlon 4D) were diluted with water and sprayed such that the applied dosage of the compound [1] became 40 g/ha, the same of the florasulam became 3.75 g/ha, and the same of the tritosulfuron became 50 g/ha. Thereafter the cultivation was continued with downside water supply, and the herbicidal activity was rated visually on day 15 after the application.

In the Test Example 87, the herbicidal activity clearly higher than that of the Comparative Example was shown with respect to any of grass species of *Galium aparine, Stellaria media*, and *Lamium amplexicaule*.

<Test Example 88> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, carfentrazone-ethyl and metsulfuron-methyl (trade name: Artus) were diluted with water and sprayed such that the applied dosage of the compound [1] became 40 g/ha, the same of the carfentrazone-ethyl became 20 g/ha, and the same of the metsulfuron-methyl became 5 g/ha. Thereafter the cultivation was continued with downside water supply, and the herbicidal activity was rated visually on day 15 after the application. In the Test Example 88, the herbicidal activity clearly higher than that of the Comparative Example was shown with respect to any of grass species of *Galium aparine, Stellaria media*, and *Lamium amplexicaule*.

<Test Example 89> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, carfentrazone-ethyl and metsulfuron-methyl (trade name: Artus) were diluted with water and sprayed such that the applied dosage of the compound [1] became 60 g/ha, the same of the carfentrazone-ethyl became 20 g/ha, and the same of the metsulfuron-methyl became 5 g/ha. Thereafter the cultivation was continued with downside water supply, and the herbicidal activity was rated visually on day 15 after the application.

In the Test Example 89, the herbicidal activity clearly higher than that of the Comparative Example was shown with respect to any of grass species of *Galium aparine, Stellaria media*, and *Lamium amplexicaule*.

\<Test Example 90\> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, carfentrazone-ethyl and metsulfuron-methyl (trade name: Artus) were diluted with water and sprayed such that the applied dosage of the compound [1] became 80 g/ha, the same of the carfentrazone-ethyl became 20 g/ha, and the same of the metsulfuron-methyl became 5 g/ha. Thereafter the cultivation was continued with downside water supply, and the herbicidal activity was rated visually on day 15 after the application.

In the Test Example 90, the herbicidal activity clearly higher than that of the Comparative Example was shown with respect to any of grass species of *Galium aparine, Stellaria media*, and *Lamium amplexicaule*.

\<Test Example 91\> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, diflufenican and isoproturon (trade name: Clayton Fenican 550) were diluted with water and sprayed such that the applied dosage of the compound [1] became 80 g/ha, the same of the diflufenican became 100 g/ha, and the same of the isoproturon became 1000 g/ha. Thereafter the cultivation was continued with downside water supply, and the herbicidal activity was rated visually on day 15 after the application.

In the Test Example 91, the herbicidal activity clearly higher than that of the Comparative Example was shown with respect to any of grass species of *Galium aparine, Stellaria media*, and *Lamium amplexicaule*.

\<Test Example 92\> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, metsulfuron-methyl and thifensulfuron-methyl (trade name: Concert SX) were diluted with water and sprayed such that the applied dosage of the compound [1] became 40 g/ha, the same of the metsulfuron-methyl became 5 g/ha, and the same of the thifensulfuron-methyl became 50 g/ha. Thereafter the cultivation was continued with downside water supply, and the herbicidal activity was rated visually on day 15 after the application.

In the Test Example 92, the herbicidal activity clearly higher than that of the Comparative Example was shown with respect to any of grass species of *Galium aparine, Stellaria media*, and *Lamium amplexicaule*.

\<Test Example 93\> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, metsulfuron-methyl and thifensulfuron-methyl (trade name: Concert SX) were diluted with water and sprayed such that the applied dosage of the compound [1] became 60 g/ha, the same of the metsulfuron-methyl became 5 g/ha, and the same of the thifensulfuron-methyl became 50 g/ha. Thereafter the cultivation was continued with downside water supply, and the herbicidal activity was rated visually on day 15 after the application.

In the Test Example 93, the herbicidal activity clearly higher than that of the Comparative Example was shown with respect to any of grass species of *Galium aparine, Stellaria media*, and *Lamium amplexicaule*.

\<Test Example 94\> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, metsulfuron-methyl and thifensulfuron-methyl (trade name: Concert SX) were diluted with water and sprayed such that the applied dosage of the compound [1] became 80 g/ha, the same of the metsulfuron-methyl became 5 g/ha, and the same of the thifensulfuron-methyl became 50 g/ha. Thereafter the cultivation was continued with downside water supply, and the herbicidal activity was rated visually on day 15 after the application.

In the Test Example 94, the herbicidal activity clearly higher than that of the Comparative Example was shown with respect to any of grass species of *Galium aparine, Stellaria media*, and *Lamium amplexicaule*.

\<Test Example 95\> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, pendimethalin and picolinafen (trade name: Picona) were diluted with water and sprayed such that the applied dosage of the compound [1] became 60 g/ha, the same of the pendimethalin became 960 g/ha, and the same of the picolinafen became 48 g/ha. Thereafter the cultivation was continued with downside water supply, and the herbicidal activity was rated visually on day 15 after the application.

In the Test Example 95, the herbicidal activity clearly higher than that of the Comparative Example was shown with respect to any of grass species of *Galium aparine, Stellaria media*, and *Lamium amplexicaule*.

\<Test Example 96\> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, iodosulfuron and mesosulfuron-methyl (trade name: Archipel) were diluted with water and sprayed such that the applied dosage of the compound [1] became 60 g/ha, the same of the iodosulfuron became 7.5 g/ha, and the same of the mesosulfuron-methyl became 7.5 g/ha. Thereafter the cultivation was continued with downside water supply, and the herbicidal activity was rated visually on day 15 after the application.

In the Test Example 96, the herbicidal activity clearly higher than that of the Comparative Example was shown with respect to any of grass species of *Galium aparine*, *Stellaria media*, and *Lamium amplexicaule*.

<Test Example 97> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, thifensulfuron-methyl and tribenuron-methyl (trade name: Pragma SX) were diluted with water and sprayed such that the applied dosage of the compound [1] became 60 g/ha, the same of the thifensulfuron-methyl became 25 g/ha, and the same of the tribenuron-methyl became 12.5 g/ha. Thereafter the cultivation was continued with downside water supply, and the herbicidal activity was rated visually on day 15 after the application.

In the Test Example 97, the herbicidal activity clearly higher than that of the Comparative Example was shown with respect to any of grass species of *Galium aparine*, *Stellaria media*, and *Lamium amplexicaule*.

<Test Example 98> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, cloquintocet-mexyl and pinoxaden (trade name: Axial Platic) were diluted with water and sprayed such that the applied dosage of the compound [1] became 60 g/ha, the same of the cloquintocet-mexyl became 12.5 g/ha, and the same of the pinoxaden became 60 g/ha. Thereafter the cultivation was continued with downside water supply, and the herbicidal activity was rated visually on day 15 after the application.

In the Test Example 98, the herbicidal activity clearly higher than that of the Comparative Example was shown with respect to any of grass species of *Galium aparine*, *Stellaria media*, and *Lamium amplexicaule*.

<Test Example 99> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, cloquintocet-mexyl and pyroxsulam (trade name: Abak) were diluted with water and sprayed such that the applied dosage of the compound [1] became 60 g/ha, the same of the cloquintocet-mexyl became 18.75 g/ha, and the same of the pyroxsulam became 18.75 g/ha. Thereafter the cultivation was continued with downside water supply, and the herbicidal activity was rated visually on day 15 after the application.

In the Test Example 99, the herbicidal activity clearly higher than that of the Comparative Example was shown with respect to any of grass species of *Galium aparine*, *Stellaria media*, and *Lamium amplexicaule*.

<Test Example 100> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, diflufenican and flurtamone (trade name: Carat) were diluted with water and sprayed such that the applied dosage of the compound [1] became 60 g/ha, the same of the diflufenican became 100 g/ha, and the same of the flurtamone became 250 g/ha. Thereafter the cultivation was continued with downside water supply, and the herbicidal activity was rated visually on day 15 after the application.

In the Test Example 100, the herbicidal activity clearly higher than that of the Comparative Example was shown with respect to any of grass species of *Galium aparine*, *Stellaria media*, and *Lamium amplexicaule*.

<Test Example 101> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3 and pyroxasulfone were diluted with water and sprayed such that the applied dosage of the compound [1] became 60 g/ha, and the same of the pyroxasulfone became 100 g/ha. Thereafter the cultivation was continued with downside water supply, and the herbicidal activity was rated visually on day 15 after the application.

In the Test Example 101, the herbicidal activity clearly higher than that of the Comparative Example was shown with respect to any of grass species of *Galium aparine*, *Stellaria media*, and *Lamium amplexicaule*.

<Test Example 102> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, pyroxasulfone and pendimethalin were diluted with water and sprayed such that the applied dosage of the compound [1] became 60 g/ha, the same of the pyroxasulfone became 100 g/ha, and the same of the pendimethalin became 1200 g/ha. Thereafter the cultivation was continued with downside water supply, and the herbicidal activity was rated visually on day 15 after the application.

In the Test Example 102, the herbicidal activity clearly higher than that of the Comparative Example was shown with respect to any of grass species of *Galium aparine*, *Stellaria media*, and *Lamium amplexicaule*.

<Test Example 103> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, dicamba and bentazon were diluted with water and sprayed such that the applied dosage of the compound [1] became 60 g/ha, the same of the dicamba became 120 g/ha, and the same of the bentazon became 240 g/ha. Thereafter the cultivation was continued with downside water supply, and the herbicidal activity was rated visually on day 15 after the application.

In the Test Example 103, the herbicidal activity clearly higher than that of the Comparative Example was shown with respect to any of grass species of *Galium aparine, Stellaria media*, and *Lamium amplexicaule*.

<Test Example 104> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3 and bentazon were diluted with water and sprayed such that the applied dosage of the compound [1] became 60 g/ha, and the same of the bentazon became 240 g/ha. Thereafter the cultivation was continued with downside water supply, and the herbicidal activity was rated visually on day 15 after the application.

In the Test Example 104, the herbicidal activity clearly higher than that of the Comparative Example was shown with respect to any of grass species of *Galium aparine, Stellaria media*, and *Lamium amplexicaule*.

<Test Example 105> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, bentazon and topramezone were diluted with water and sprayed such that the applied dosage of the compound [1] became 60 g/ha, the same of the bentazon became 240 g/ha, and the same of the topramezone became 16 g/ha. Thereafter the cultivation was continued with downside water supply, and the herbicidal activity was rated visually on day 15 after the application.

In the Test Example 105, the herbicidal activity clearly higher than that of the Comparative Example was shown with respect to any of grass species of *Galium aparine, Stellaria media*, and *Lamium amplexicaule*.

<Test Example 106> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3 and quizalofop-ethyl were diluted with water and sprayed such that the applied dosage of the compound [1] became 60 g/ha, and the same of the quizalofop-ethyl became 14 g/ha. Thereafter the cultivation was continued with downside water supply, and the herbicidal activity was rated visually on day 15 after the application.

In the Test Example 106, the herbicidal activity clearly higher than that of the Comparative Example was shown with respect to any of grass species of *Galium aparine, Stellaria media*, and *Lamium amplexicaule*.

<Test Example 107> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3 and tri-allate were diluted with water and sprayed such that the applied dosage of the compound [1] became 60 g/ha, and the same of the tri-allate became 800 g/ha. Thereafter the cultivation was continued with downside water supply, and the herbicidal activity was rated visually on day 15 after the application.

In the Test Example 107, the herbicidal activity clearly higher than that of the Comparative Example was shown with respect to any of grass species of *Galium aparine, Stellaria media*, and *Lamium amplexicaule*.

<Test Example 108> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, dicamba and tritosulfuron were diluted with water and sprayed such that the applied dosage of the compound [1] became 60 g/ha, the same of the dicamba became 240 g/ha, and the same of the tritosulfuron became 50 g/ha. Thereafter the cultivation was continued with downside water supply, and the herbicidal activity was rated visually on day 15 after the application.

In the Test Example 108, the herbicidal activity clearly higher than that of the Comparative Example was shown with respect to any of grass species of *Galium aparine, Stellaria media*, and *Lamium amplexicaule*.

<Test Example 109> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, picolinafen and tritosulfuron were diluted with water and sprayed such that the applied dosage of the compound [1] became 60 g/ha, the same of the picolinafen became 48 g/ha, and the same of the tritosulfuron became 5 g/ha. Thereafter the cultivation was continued with downside water supply, and the herbicidal activity was rated visually on day 15 after the application.

In the Test Example 109, the herbicidal activity clearly higher than that of the Comparative Example was shown with respect to any of grass species of *Galium aparine, Stellaria media*, and *Lamium amplexicaule*.

<Test Example 110> Herbicidal Activity Test at Application after Emergence of Weed in Dry-Field Farming

*Galium aparine, Stellaria media* and *Lamium amplexicaule* were grown in the plastic pots according to the Test Example 1. The flowable formulation prepared according to the Example 3, fentrazamide and isoxadifen were diluted with water and sprayed such that the applied dosage of the compound [1] became 60 g/ha, the same of the fentrazamide became 300 g/ha, and the same of the isoxadifen became 150 g/ha. Thereafter the cultivation was continued with downside water supply, and the herbicidal activity was rated visually on day 15 after the application.

In the Test Example 110, the herbicidal activity clearly higher than that of the Comparative Example was shown with respect to any of grass species of *Galium aparine*, *Stellaria media*, and *Lamium amplexicaule*.

<Test Example 111> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, fentrazamide and isoxadifen-ethyl were diluted with water and sprayed such that the applied dosage of the compound [1] became 60 g/ha, the same of the fentrazamide became 300 g/ha, and the same of the isoxadifen-ethyl became 150 g/ha. Thereafter the cultivation was continued with downside water supply, and the herbicidal activity was rated visually on day 15 after the application.

In the Test Example 111, the herbicidal activity clearly higher than that of the Comparative Example was shown with respect to any of grass species of *Galium aparine*, *Stellaria media*, and *Lamium amplexicaule*.

<Test Example 112> Herbicidal Activity Test at Application after Emergence of Weed in Dry-Field Farming

*Galium aparine*, *Stellaria media* and *Lamium amplexicaule* were grown in the plastic pots according to the Test Example 1. The flowable formulation prepared according to the Example 3, MCPA and bentazon were diluted with water and sprayed such that the applied dosage of the compound [1] became 60 g/ha, the same of the MCPA became 500 g/ha, and the same of the bentazon became 240 g/ha. Thereafter the cultivation was continued with downside water supply, and the herbicidal activity was rated visually on day 15 after the application.

In the Test Example 112, the herbicidal activity clearly higher than that of the Comparative Example was shown with respect to any of grass species of *Galium aparine*, *Stellaria media*, and *Lamium amplexicaule*.

Test Examples 113 to 150

Among the ingredients used in Test Examples 113 to 150, with respect to dicamba, fluroxypyr, florasulam, pyraflufen-ethyl, carfentrazone-ethyl, ioxynil, flufenacet, pyroxasulfone, isoxaflutole, tri-allate, pinoxaden, clethodim, pendimethalin, chlorpropham, diflufenican, prosulfocarb, and quizalofop-ethyl, the commercial products listed in Table 1 were used.

TABLE 1

List of Used Herbicide Commercial Products

| Compound | Trade name |
|---|---|
| Dicamba | Banvel |
| Fluroxypyr | Starane 200 EC |
| Florasulam | Primus 50 SC |
| Pyraflufen-ethyl | Ecopart Flowable |
| Carfentrazone-ethyl | Aim |

TABLE 1-continued

List of Used Herbicide Commercial Products

| Compound | Trade name |
|---|---|
| Ioxynil | Actinol Emulsion |
| Flufenacet | Define DF |
| Pyroxasulfone | Zidua 85WG |
| Isoxaflutole | Balance Pro |
| Tri-allate | Avadex |
| Pinoxaden | Axial XL |
| Clethodim | Select Emulsion |
| Pendimethalin | Prowl H2O |
| Chlorpropham | Chloro-IPC |
| Diflufenican | Mohican |
| Prosulfocarb | Boxer Emulsion |
| Quizalofop-ethyl | Poruto Flowable |

<Test Example 113> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4, and a commercial product containing dicamba shown in the Table 1 were diluted with water and sprayed such that the applied dosage of the compound [1] became 30 g/ha, and the same of the dicamba became 120 g/ha. Thereafter the cultivation was continued with downside water supply, and the herbicidal activity was rated visually on day 15 after the application. The evaluation index was expressed from 0 (no activity) to 100 (completely killed). Additionally, as a Comparative Example a flowable formulation containing the compound [1], which was the Component A, was prepared according to the Example 4, and sprayed such that the dosage of the compound [1] became 30 g/ha, and the herbicidal activity was rated in the same manner as in the Test Example 113. Further, as a Comparative Example a flowable formulation containing dicamba, which was the Component B, was prepared in the same manner as in the Example 4, and sprayed such that the dosage of the dicamba became 120 g/ha, and the herbicidal activity was rated in the same manner as in the Test Example 113. Also in Test the Examples 114 to 134, as Comparative Examples, flowable formulations were prepared in the same manner with the respective Components A or Components B used in the Test Examples, sprayed at the application dosages used in the respective Test Examples, and the herbicidal activities were rated. The results are shown in Table 2.

In the Test Example 113, an effect exceeding the formal sum of the herbicidal effects of the cases where the Component A or the Component B was individually applied to *Papaver rhoeas* was recognized in the combination according to the present invention. The value found in the test showed an effect above the expected value calculated by the following Colby's formula at a suitable low dosage [see S. R. Colby, Weeds, 15 (1967) pp. 20-22].

Colby's formula:
$$\text{Expected value}(E) = X + Y - XY/100$$

where X represents a suppression rate (evaluation index) of the agent a at the concentration x, and Y represents a suppression rate (evaluation index) of the agent b at the concentration y. The same applies in the following Test Examples.

\<Test Example 114\> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and a wettable powder formulation containing clopyralid prepared according to the Example 1 were diluted with water and sprayed such that the applied dosage of the compound [1] became 30 g/ha and the same of the clopyralid became 50 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 114, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

\<Test Example 115\> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and a wettable powder formulation containing halauxifen-methyl prepared according to the Example 1 were diluted with water and sprayed such that the applied dosage of the compound [1] became 30 g/ha and the same of the halauxifen-methyl became 10 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 115, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

\<Test Example 116\> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing fluroxypyr shown in the Table 1 were diluted with water and sprayed such that the applied dosage of the compound [1] became 30 g/ha and the same of the fluroxypyr became 100 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 116, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

\<Test Example 117\> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing florasulam shown in the Table 1 were diluted with water and sprayed such that the applied dosage of the compound [1] became 30 g/ha and the same of the florasulam became 2 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 117, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

\<Test Example 118\> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and a wettable powder formulation containing tribenuron-methyl prepared according to the Example 1 were diluted with water and sprayed such that the applied dosage of the compound [1] became 30 g/ha and the same of the tribenuron-methyl became 6 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 118, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 119> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing pyraflufen-ethyl shown in the Table 1 were diluted with water and sprayed such that the applied dosage of the compound [1] became 30 g/ha and the same of the pyraflufen-ethyl became 2.7 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 119, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 120> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing carfentrazone-ethyl shown in the Table 1 were diluted with water and sprayed such that the applied dosage of the compound [1] became 30 g/ha and the same of the carfentrazone-ethyl became 2.3 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 120, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 121> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing ioxynil shown in the Table 1 were diluted with water and sprayed such that the applied dosage of the compound [1] became 30 g/ha and the same of the ioxynil became 37.5 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 121, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 122> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing flufenacet shown in the Table 1 were diluted with water and sprayed such that the applied dosage of the compound [1] became 30 g/ha and the same of the flufenacet became 300 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 122, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 123> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing pyroxasulfone shown in the Table 1 were diluted with water and sprayed such that the applied dosage of the compound [1] became 30 g/ha and the same of the pyroxasulfone became 100 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 123, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 124> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing isoxaflutole shown in the Table 1 were diluted with water and sprayed such that the applied dosage of the compound [1] became 30 g/ha and the same of the isoxaflutole became 50 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 124, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 125> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and a wettable powder formulation containing bicyclopyrone prepared according to the Example 1 were diluted with water and sprayed such that the applied dosage of the compound [1] became 30 g/ha and the same of the bicyclopyrone became 50 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 125, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 126> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing tri-allate shown in the Table 1 were diluted with water and sprayed such that the applied dosage of the compound [1] became 30 g/ha and the same of the tri-allate became 800 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 126, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 127> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] and prepared according to the Example 4, and the commercial product containing pinoxaden shown in the Table 1 were diluted with water and sprayed such that the applied dosage of the compound [1] became 30 g/ha, and the same of the pinoxaden became 60 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 127, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 128> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing clethodim shown in the Table 1 were diluted with water and sprayed such that the applied dosage of the compound [1] became 30 g/ha and the same of the clethodim became 120 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 128, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 129> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing pendimethalin shown in the Table 1 were diluted with water and sprayed such that the applied dosage of the compound [1] became 30 g/ha and the same of the pendimethalin became 600 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 129, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 130> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4 and the commercial product containing chlorpropham shown in the Table 1 were diluted with water and sprayed such that the applied dosage of the compound [1] became 30 g/ha and the same of the chlorpropham became 100 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 130, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 131> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4, the commercial product containing flufenacet shown in the Table 1, and the commercial product containing diflufenican shown in the Table 1 were diluted with water and sprayed such that the applied dosage of the compound [1] became 30 g/ha, the same of the flufenacet became 120 g/ha, and the same of the diflufenican became 30 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 131, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 132> Herbicidal Activity Test at Application after Emergence of Weed in Dry-Field Farming A plastic pot with a length, a width, and a depth of equally 9 cm was filled with a soil, in which the seed of *Papaver rhoeas* was seeded in the soil surface layer. Thereafter, *Papaver rhoeas* was grown to 14 (BBCH scale), to which a flowable formulation containing the compound [1] prepared according to the Example 4, the commercial product containing flufenacet shown in the Table 1, and the commercial product containing pendimethalin shown in the Table 1 were diluted with water and sprayed such that the applied dosage of the compound [1] became 30 g/ha, the same of the flufenacet became 240 g/ha, and the same of the pendimethalin became 1200 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 132, an effect exceeding the formal sum of the herbicidal effects of the cases where the Component A or the Component B was individually applied to *Papaver rhoeas* was recognized in the combination according to the present invention. The value found in the test showed an effect above the expected value calculated by the Colby's formula at a suitable low dosage [see S. R. Colby, Weeds, 15 (1967) pp. 20-22].

<Test Example 133> Herbicidal Activity Test at Application after Emergence of Weed in Dry-Field Farming A plastic pot with a length, a width, and a depth of equally 9 cm was filled with a soil, in which the seed of *Papaver* rhoeas was seeded in the soil surface layer. Thereafter, Papaver rhoeas was grown to 14 (BBCH scale), to which a flowable formulation containing the compound [1] prepared according to the Example 4, the commercial product containing florasulam shown in the Table 1, and the commercial product containing fluroxypyr shown in the Table 1 were diluted with water and sprayed such that the applied dosage of the compound [1] became 30 g/ha, the same of the florasulam became 1.3 g/ha, and the same of the fluroxypyr became 50 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 133, an effect exceeding the formal sum of the herbicidal effects of the cases where the Component A or the Component B was individually applied to Papaver rhoeas was recognized in the combination according to the present invention. The value found in the test showed an effect above the expected value calculated by the Colby's formula at a suitable low dosage [see S. R. Colby, Weeds, 15 (1967) pp. 20-22].

<Test Example 134> Herbicidal Activity Test at Application after Emergence of Weed in Dry-Field Farming A plastic pot with a length, a width, and a depth of equally 9 cm was filled with a soil, in which the seed of Papaver rhoeas was seeded in the soil surface layer. Thereafter, Papaver rhoeas was grown to 14 (BBCH scale), to which a flowable formulation containing the compound [1] prepared according to the Example 4, a wettable powder formulation containing clopyralid and prepared according to the Example 1, and the commercial product containing fluroxypyr shown in the Table 1 were diluted with water and sprayed such that the applied dosage of the compound [1] became 30 g/h, the same of the clopyralid became 22.5 g/ha, and the same of the fluroxypyr became 50 g/ha. Thereafter the cultivation was continued with downside water supply, and the herbicidal activity was rated visually on day 15 after the application. The evaluation index was expressed from 0 (no activity) to 100 (completely killed). The results are shown in the Table 2.

In the Test Example 134, an effect exceeding the formal sum of the herbicidal effects of the cases where the Component A or the Component B was individually applied to Papaver rhoeas was recognized in the combination according to the present invention. The value found in the test showed an effect above the expected value calculated by the Colby's formula at a suitable low dosage [see S. R. Colby, Weeds, 15 (1967) pp. 20-22].

TABLE 2

| | | Test Example Reagents used for tests(a.i./10a) | | | | Papaver rhoeas 15 Days after application | | |
| --- | --- | --- | --- | --- | --- | --- | --- | --- |
| | | | | | | Evaluation index | Expected value | Difference |
| | Comp. [1] | 30.0 g | | | | 40 | | |
| | | Dicamba | 120.0 g | | | 80 | | |
| | | Clopyralid | 50.0 g | | | 33 | | |
| | | Halauxifen-methyl | 10.0 g | | | 63 | | |
| | | Fluroxypyr | 100.0 g | | | 73 | | |
| | | Florasulam | 2.0 g | | | 67 | | |
| | | Tribenuron-methyl | 6.0 g | | | 43 | | |
| | | Pyraflufen-ethyl | 2.7 g | | | 50 | | |
| | | Carfentrazone-ethyl | 2.3 g | | | 47 | | |
| | | Ioxynil | 37.5 g | | | 73 | | |
| | | Flufenacet | 300.0 g | | | 57 | | |
| | | Pyroxasulfone | 100.0 g | | | 82 | | |
| | | Isoxaflutole | 50.0 g | | | 77 | | |
| | | Bicyclopyrone | 50.0 g | | | 53 | | |
| | | Tri-allate | 800.0 g | | | 53 | | |
| | | Pinoxaden | 60.0 g | | | 63 | | |
| | | Clethodim | 120.0 g | | | 55 | | |
| | | Pendimethalin | 600.0 g | | | 53 | | |
| | | Chlorpropham | 100.0 g | | | 50 | | |
| | | Flufenacet | 120.0 g | + Diflufenican | 30.0 g | 83 | | |
| | | Flufenacet | 240.0 g | + Pendimethalin | 1200.0 g | 70 | | |
| | | Florasulam | 1.3 g | + Fluroxypyr | 50.0 g | 83 | | |
| | | Clopyralid | 22.5 g | + Fluroxypyr | 50.0 g | 73 | | |
| 113 | Comp. [1] 30.0 g + | Dicamba | 120.0 g | | | 100 | 88 | 12 |
| 114 | Comp. [1] 30.0 g + | Clopyralid | 50.0 g | | | 100 | 60 | 40 |
| 115 | Comp. [1] 30.0 g + | Halauxifen-methyl | 10.0 g | | | 100 | 78 | 22 |
| 116 | Comp. [1] 30.0 g + | Fluroxypyr | 100.0 g | | | 100 | 84 | 16 |
| 117 | Comp. [1] 30.0 g + | Florasulam | 2.0 g | | | 91 | 80 | 11 |
| 118 | Comp. [1] 30.0 g + | Tribenuron-methyl | 6.0 g | | | 97 | 66 | 31 |
| 119 | Comp. [1] 30.0 g + | Pyraflufen-ethyl | 2.7 g | | | 82 | 70 | 12 |
| 120 | Comp. [1] 30.0 g + | Carfentrazone-ethyl | 2.3 g | | | 92 | 68 | 24 |
| 121 | Comp. [1] 30.0 g + | Ioxynil | 37.5 g | | | 100 | 84 | 16 |
| 122 | Comp. [1] 30.0 g + | Flufenacet | 300.0 g | | | 100 | 74 | 26 |
| 123 | Comp. [1] 30.0 g + | Pyroxasulfone | 100.0 g | | | 100 | 89 | 11 |
| 124 | Comp. [1] 30.0 g + | Isoxaflutole | 50.0 g | | | 100 | 86 | 14 |
| 125 | Comp. [1] 30.0 g + | Bicyclopyrone | 50.0 g | | | 95 | 72 | 23 |
| 126 | Comp. [1] 30.0 g + | Tri-allate | 800.0 g | | | 92 | 72 | 20 |
| 127 | Comp. [1] 30.0 g + | Pinoxaden | 60.0 g | | | 100 | 78 | 22 |
| 128 | Comp. [1] 30.0 g + | Clethodim | 120.0 g | | | 97 | 73 | 24 |

TABLE 2-continued

| | Test Example | Reagents used for tests(a.i./10a) | | | | | | Papaver rhoeas 15 Days after application | | |
| | | | | | | | | Evaluation index | Expected value | Difference |
|---|---|---|---|---|---|---|---|---|---|---|
| 129 | Comp. [1] | 30.0 g | + Pendimethalin | 600.0 g | | | | 85 | 72 | 13 |
| 130 | Comp. [1] | 30.0 g | + Chlorpropham | 100.0 g | | | | 93 | 70 | 23 |
| 131 | Comp. [1] | 30.0 g | + Flufenacet | 120.0 g | + Diflufenican | 30.0 g | | 100 | 90 | 10 |
| 132 | Comp. [1] | 30.0 g | + Flufenacet | 240.0 g | + Pendimethalin | 1200.0 g | | 100 | 82 | 18 |
| 133 | Comp. [1] | 30.0 g | + Florasulam | 1.3 g | + Fluroxypyr | 50.0 g | | 100 | 90 | 10 |
| 134 | Comp. [1] | 30.0 g | + Clopyralid | 22.5 g | + Fluroxypyr | 50.0 g | | 97 | 84 | 13 |

<Test Example 135> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4 and a wettable powder formulation containing tribenuron-methyl prepared according to the Example 1 were diluted with water and sprayed such that the applied dosage of the compound [1] became 30 g/ha and the same of the tribenuron-methyl became 6 g/ha. Thereafter the cultivation was continued with downside water supply, and the herbicidal activity was rated visually on day 6 after the application. The evaluation index was expressed from 0 (no activity) to 100 (completely killed). As a Comparative Example, a flowable formulation containing the compound [1] which was the Component A was prepared according to the Example 4 and sprayed such that the applied dosage of the compound [1] became 30 g/ha, and the herbicidal activity was rated in the same manner as in the Test Example 135. The above Comparative Example was also used as the Comparative Example for the Test Examples 136 to 150. As a Comparative Example, a flowable formulation containing tribenuron-methyl which was the Component B was prepared according to the Example 4 and sprayed such that the applied dosage of the tribenuron-methyl became 6 g/ha, and the herbicidal activity was rated in the same manner as in the Test Example 135. Also in the Test Examples 136 to 150, as Comparative Examples, the Component A and the Component B used in the respective Test Examples were individually formulated identically into flowable formulations and sprayed at the dosages used in the respective Test Examples and the herbicidal activities were evaluated. The results are shown in Table 3.

In the Test Example 135, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 136> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4 and the commercial product containing diflufenican shown in the Table 1 were diluted with water and sprayed such that the applied dosage of the compound [1] became 30 g/ha and the same of the diflufenican became 100 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 136, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 137> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4 and a wettable powder formulation containing picolinafen prepared according to the Example 1 were diluted with water and sprayed such that the applied dosage of the compound [1] became 30 g/ha and the same of the picolinafen became 48 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 137, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 138> Herbicidal Activity Test at Application after Emergence of Weed in Dry-Field Farming A plastic pot with a length, a width, and a depth of equally 9 cm was filled with a soil, in which the seed of *Matricaria*

*chamomilla* was seeded in the soil surface layer. Thereafter, *Matricaria chamomilla* was grown to 14 (BBCH scale), to which a flowable formulation containing the compound [1] prepared according to the Example 4 and the commercial product containing prosulfocarb shown in the Table 1 were diluted with water and sprayed such that the applied dosage of the compound [1] became 30 g/ha and the same of the prosulfocarb became 2400 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 138, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 139> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4 and the commercial product containing flufenacet shown in the Table 1 were diluted with water and sprayed such that the applied dosage of the compound [1] became 30 g/ha and the same of the flufenacet became 300 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 139, an effect exceeding the formal sum of the herbicidal effects of the cases where the Component A or the Component B was individually applied to *Matricaria chamomilla* was recognized in the combination according to the present invention.

The value found in the test showed an effect above the expected value calculated by the Colby's formula at a suitable low dosage [see S. R. Colby, Weeds, 15 (1967) pp. 20-22].

<Test Example 140> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4 and the commercial product containing pyroxasulfone shown in the Table 1 were diluted with water and sprayed such that the applied dosage of the compound [1] became 30 g/ha and the same of the pyroxasulfone became 100 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 140, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 141> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4 and the commercial product containing tri-allate shown in the Table 1 were diluted with water and sprayed such that the applied dosage of the compound [1] became 30 g/ha and the same of the tri-allate became 800 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 141, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 142> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] and prepared according to the Example 4 and the commercial product containing pinoxaden shown in the Table 1 were diluted with water and sprayed such that the applied dosage of the compound [1] became 30 g/ha and the same of the pinoxaden became 60 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 142, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 143> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4 and the commercial product containing clethodim shown in the Table 1 were diluted with water and sprayed such that the applied dosage of the compound [1] became 30 g/ha and the same of the clethodim became 120 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 143, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 144> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4 and the commercial product containing quizalofop-ethyl shown in the Table 1 were diluted with water and sprayed such that the applied dosage of the compound [1] became 30 g/ha and the same of the quizalofop-ethyl became 14 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 144, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 145> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4 and the commercial product containing pendimethalin shown in the Table 1 were diluted with water and sprayed such that the applied dosage of the compound [1] became 30 g/ha and the same of the pendimethalin became 600 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 145, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 146> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4 and the commercial product containing chlorpropham shown in the Table 1 were diluted with water and sprayed such that the applied dosage of the compound [1] became 30 g/ha and the same of the chlorpropham became 100 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 146, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 147> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4, the commercial product containing flufenacet shown in the Table 1, and the commercial product containing diflufenican shown in the Table 1 were diluted with water and sprayed such that the applied dosage of the compound [1] became 30 g/ha, the same of the flufenacet became 120 g/ha, and the same of the diflufenican became 30 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 147, an effect exceeding the formal sum of the herbicidal effects of the cases where the Component A or the Component B was individually applied to

*Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 148> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4, the commercial product containing flufenacet shown in the Table 1, and the commercial product containing pendimethalin shown in the Table 1 were diluted with water and sprayed such that the applied dosage of the compound [1] became 30 g/ha, the same of the flufenacet became 240 g/ha, and the same of the pendimethalin became 1200 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 148, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 149> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4, a wettable powder formulation containing picolinafen prepared according to the Example 1, and the commercial product containing pendimethalin shown in the Table 1 were diluted with water and sprayed such that the applied dosage of the compound [1] became 30 g/ha, the same of the picolinafen became 48 g/ha, and the same of the pendimethalin became 960 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 149, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

<Test Example 150> Herbicidal Activity Test at Application after Emergence of Weed in Dry-Field Farming A plastic pot with a length, a width, and a depth of equally 9 cm was filled with a soil, in which the seed of *Matricaria chamomilla* was seeded in the soil surface layer. Thereafter, *Matricaria chamomilla* was grown to 14 (BBCH scale), to which a flowable formulation containing the compound [1] prepared according to the Example 4, a wettable powder formulation containing pyroxasulfone shown in the Table 1, and the commercial product containing pendimethalin shown in the Table 1 were diluted with water and sprayed such that the applied dosage of the compound [1] became 30 g/ha, the same of the pyroxasulfone became 100 g/ha, and the same of the pendimethalin became 1200 g/ha. Thereafter the cultivation was continued with downside water supply, and the herbicidal activity was rated visually on day 6 after the application. The evaluation index was expressed from 0 (no activity) to 100 (completely killed). The results are shown in the Table 3.

In the Test Example 150, an effect exceeding the formal sum of the herbicidal effects of the cases where the Component A or the Component B was individually applied to *Matricaria chamomilla* was recognized in the combination according to the present invention. The value found in the test showed an effect above the expected value calculated by the Colby's formula at a suitable low dosage [see S. R. Colby, Weeds, 15 (1967) pp. 20-22].

TABLE 3

| Test Example Reagents used for tests (a.i./10a) | | | | | Matricaria chamomilla 6 Days after application | | |
|---|---|---|---|---|---|---|---|
| | | | | | Evaluation index | Expected value | Difference |
| Comp. [1] | 30.0 g | | | | 42 | | |
| | | Tribenuron-methyl | 6.0 g | | 13 | | |
| | | Diflufenican | 100.0 g | | 33 | | |
| | | Picolinafen | 48.0 g | | 47 | | |
| | | Prosulfocarb | 2400.0 g | | 20 | | |
| | | Flufenacet | 300.0 g | | 30 | | |
| | | Pyroxasulfone | 100.0 g | | 28 | | |
| | | Tri-allate | 800.0 g | | 20 | | |
| | | Pinoxaden | 60.0 g | | 33 | | |
| | | Clethodim | 120.0 g | | 23 | | |
| | | Quizalofop-ethyl | 14.0 g | | 23 | | |
| | | Pendimethalin | 600.0 g | | 23 | | |
| | | Chlorpropham | 100.0 g | | 30 | | |
| | | Flufenacet | 120.0 g | + Diflufenican 30.0 g | 15 | | |

TABLE 3-continued

|  |  |  | | Test Example Reagents used for tests (a.i./10a) | | | | | Matricaria chamomilla 6 Days after application | | |
|---|---|---|---|---|---|---|---|---|---|---|---|
|  |  |  |  |  |  |  |  |  | Evaluation index | Expected value | Difference |
|  |  |  |  | Flufenacet | 240.0 g | + | Pendimethalin | 1200.0 g | 28 | | |
|  |  |  |  | Picolinafen | 48.0 g | + | Pendimethalin | 960.0 g | 23 | | |
|  |  |  |  | Pyroxasulfone | 100.0 g | + | Pendimethalin | 1200.0 g | 37 | | |
| 135 | Comp. [1] | 30.0 g | + | Tribenuron-methyl | 6.0 g | | | | 72 | 50 | 22 |
| 136 | Comp. [1] | 30.0 g | + | Diflufenican | 100.0 g | | | | 83 | 61 | 22 |
| 137 | Comp. [1] | 30.0 g | + | Picolinafen | 48.0 g | | | | 82 | 69 | 13 |
| 138 | Comp. [1] | 30.0 g | + | Prosulfocarb | 2400.0 g | | | | 68 | 54 | 14 |
| 139 | Comp. [1] | 30.0 g | + | Flufenacet | 300.0 g | | | | 73 | 59 | 14 |
| 140 | Comp. [1] | 30.0 g | + | Pyroxasulfone | 100.0 g | | | | 73 | 58 | 15 |
| 141 | Comp. [1] | 30.0 g | + | Tri-allate | 800.0 g | | | | 72 | 54 | 18 |
| 142 | Comp. [1] | 30.0 g | + | Pinoxaden | 60.0 g | | | | 77 | 61 | 16 |
| 143 | Comp. [1] | 30.0 g | + | Clethodim | 120.0 g | | | | 73 | 56 | 17 |
| 144 | Comp. [1] | 30.0 g | + | Quizalofop-ethyl | 14.0 g | | | | 72 | 56 | 16 |
| 145 | Comp. [1] | 30.0 g | + | Pendimethalin | 600.0 g | | | | 68 | 56 | 12 |
| 146 | Comp. [1] | 30.0 g | + | Chlorpropham | 100.0 g | | | | 72 | 59 | 13 |
| 147 | Comp. [1] | 30.0 g | + | Flufenacet | 120.0 g | + | Diflufenican | 30.0 g | 75 | 51 | 24 |
| 148 | Comp. [1] | 30.0 g | + | Flufenacet | 240.0 g | + | Pendimethalin | 1200.0 g | 70 | 58 | 12 |
| 149 | Comp. [1] | 30.0 g | + | Picolinafen | 48.0 g | + | Pendimethalin | 960.0 g | 68 | 56 | 12 |
| 150 | Comp. [1] | 30.0 g | + | Pyroxasulfone | 100.0 g | + | Pendimethalin | 1200.0 g | 75 | 63 | 12 |

It has been demonstrated that the herbicide composition of the present invention exhibits a broad weed control spectrum, because owing to a combination of the Component A selected from the group consisting of an oxopyrazine derivative represented by the Formula X and salts thereof, and at least one herbicide, plant growth regulator, or safener selected from the above-listed Components B, which are active ingredients of the composition, not only an additive effect of the respective herbicidal activities, but also a synergistic weed killing activity may be obtained, or herbicide injury may be mitigated synergistically, and it is effective on a variety of grass species. Moreover, since an allowable time range for herbicide application is wider compared with the conventional herbicides, and emergence of weeds may be controlled for a long period of time, as well as the safety has been confirmed with respect to both Component A and Component B so as to prohibit herbicide injury in small grain cereals, the herbicide composition is able to contribute to labor-saving in cultivation and increase in production of crops.

The invention claimed is:

1. An herbicide composition comprising, as active ingredients, at least one component A and at least one component B,
   wherein the component A is an oxopyrazine compound represented by the following formula [I] or a salt thereof:

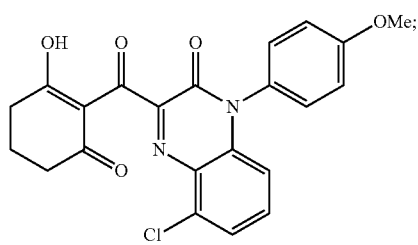

and
   the component B is a compound selected from the group consisting of chlorpropham, clethodim, clopyralid, dicamba, diflufenican, florasulam, flufenacet, fluroxypyr, isoxaflutole, pinoxaden, picolinafen, pyraflufenethyl, quizalofop-ethyl, triallate, tribenuron-methyl, ioxynil, bicyclopyrone and halauxifen-methyl.

2. The herbicide composition according to claim 1, wherein a mass ratio of the component A to the component B is 1:0.001 to 1:1000.

3. A formulated herbicide composition comprising the herbicide composition according to claim 1 in an amount adequate for exhibiting herbicidal activity, and at least one carrier selected from the group consisting of a liquid carrier and a solid carrier.

4. The formulated herbicide composition according to claim 3, further comprising at least one surfactant.

5. A method for producing a formulated herbicide composition, comprising mixing the herbicide composition according to claim 1 in an amount adequate for exhibiting herbicidal activity and at least one carrier selected from the group consisting of a liquid carrier and a solid carrier.

6. The method according to claim 5, further comprising mixing at least one surfactant with the herbicide composition and the carrier.

7. A method for controlling the growth of an undesirable plant comprising applying the herbicide composition according to claim 1 to a useful plant, to land where the useful plant is grown, to land where the useful plant will be grown, or to non-crop land at one time or separately.

8. The method according to claim 7, wherein the useful plant is a small grain cereal.

* * * * *